(12) United States Patent
Sawada et al.

(10) Patent No.: US 10,546,692 B2
(45) Date of Patent: Jan. 28, 2020

(54) MULTILAYER CERAMIC ELECTRONIC COMPONENT

(71) Applicant: Murata Manufacturing Co., Ltd., Nagaokakyo-shi, Kyoto-fu (JP)

(72) Inventors: Takashi Sawada, Nagaokakyo (JP); Yoshihiro Fukuda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 38 days.

(21) Appl. No.: 15/811,758

(22) Filed: Nov. 14, 2017

(65) Prior Publication Data

US 2018/0137982 A1 May 17, 2018

(30) Foreign Application Priority Data

Nov. 15, 2016 (JP) ................................. 2016-222317

(51) Int. Cl.
*H01G 4/232* (2006.01)
*H01G 4/30* (2006.01)
*H01G 4/012* (2006.01)
*H01G 4/12* (2006.01)

(52) U.S. Cl.
CPC ............... *H01G 4/30* (2013.01); *H01G 4/012* (2013.01); *H01G 4/232* (2013.01); *H01G 4/12* (2013.01)

(58) Field of Classification Search
CPC ............................... H01G 4/228; H01G 4/232
USPC .......................................... 361/303; 333/185
See application file for complete search history.

(56) References Cited

U.S. PATENT DOCUMENTS

| | | | |
|---|---|---|---|
| 2001/0010617 A1* | 8/2001 | Miyazaki | H01F 17/0013 361/321.2 |
| 2003/0030510 A1 | 2/2003 | Sasaki et al. | |
| 2007/0211410 A1 | 9/2007 | Togashi | |
| 2008/0186652 A1* | 8/2008 | Lee | H01G 4/012 361/306.3 |
| 2008/0297976 A1* | 12/2008 | Togashi | H01G 4/232 361/306.3 |

(Continued)

FOREIGN PATENT DOCUMENTS

| | | | | |
|---|---|---|---|---|
| JP | 09148174 A | * | 6/1997 | ............ H01G 4/232 |
| JP | 2007-243039 A | | 9/2007 | |

(Continued)

OTHER PUBLICATIONS

Official Communication issued in Korean Patent Application No. 10-2017-0149379, dated Jan. 7, 2019.

*Primary Examiner* — Eric W Thomas
(74) *Attorney, Agent, or Firm* — Keating & Bennett, LLP

(57) ABSTRACT

A multilayer ceramic electronic component includes a first external electrode and a second external electrode. The first external electrode includes a first extension portion that extends to a third side surface. The second external electrode includes a second extension portion that extends to the third side surface. When the third side surface is viewed from a direction in which the third side surface and a fourth side surface are opposed, the first extension portion and the second extension portion each include a base portion extending along an edge of the third side surface in a first direction, and protrusion portions extending from both ends of the base portion in the first direction along edges of the third side surface in the direction in which a first side surface and a second side surface are opposed.

19 Claims, 12 Drawing Sheets

(56) References Cited

U.S. PATENT DOCUMENTS

2010/0033938 A1  2/2010  Kitagawa et al.

FOREIGN PATENT DOCUMENTS

| JP | 2010-045085 A | 2/2010 |
| JP | 2014-187289 A | 10/2014 |
| KR | 10-2003-0014586 A | 2/2003 |

* cited by examiner

MULTILAYER CERAMIC ELECTRONIC COMPONENT

CROSS REFERENCE TO RELATED APPLICATIONS

This application claims the benefit of priority to Japanese Patent Application No. 2016-222317 filed on Nov. 15, 2016. The entire contents of this application are hereby incorporated herein by reference.

BACKGROUND OF THE INVENTION

1. Field of the Invention

The present invention relates to a multilayer ceramic electronic component.

2. Description of the Related Art

Japanese Patent Application Laid-Open No. 2010-45085 discloses multilayer ceramic capacitors that reduce a noise referred to as an acoustic noise due to the multilayer ceramic capacitors mounted on a printed wiring board. According to the structure of multilayer ceramic capacitors as described in Japanese Patent Application Laid-Open No. 2010-45085, two of four multilayer ceramic capacitors mounted on a printed wiring board are located along one axis, and the other two thereof are located along another axis perpendicular or substantially perpendicular to the foregoing axis.

SUMMARY OF THE INVENTION

Preferred embodiments of the invention provide multilayer ceramic electronic components that significantly reduce or prevent acoustic noise.

A multilayer ceramic electronic component according to a preferred embodiment of the present invention includes a rectangular parallelepiped or substantially rectangular parallelepiped laminated body, a first external electrode, and a second external electrode. The laminated body includes a plurality of dielectric layers and a plurality of conductor layers. The laminated body includes a first principal surface and a second principal surface opposed to each other in a laminating direction, a first side surface and a second side surface opposed to each other, which extend parallel or substantially parallel to the laminating direction, and a third side surface and a fourth side surface opposed to each other, which extend parallel or substantially parallel to the laminating direction, perpendicular or substantially perpendicular to each of the first side surface and the second side surface. The first external electrode is provided at least partially on the first side surface. The second external electrode is provided at least partially on the second side surface. Among the plurality of conductor layers, at least one conductor layer includes a first side surface extension portion extended to the first side surface. Among the plurality of conductor layers, at least one conductor layer includes a second side surface extension portion extended to the second side surface. The first external electrode is electrically connected to the first side surface extension portion. The second external electrode is electrically connected to the second side surface extension portion. The first external electrode includes a first extension portion that extends to the third side surface. The second external electrode includes a second extension portion that extends to the third side surface. When the third side surface is viewed from the direction in which the third side surface and the fourth side surface are opposed, the first extension portion and the second extension portion each include a base portion extending along an edge of the third side surface in the laminating direction described above, and protrusion portions extending from both ends of the base portion in the laminating direction along edges of the third side surface and extending in the direction in which the first side surface and the second side surface are opposed.

According to a preferred embodiment of the present invention, the first external electrode and the second external electrode are electrically connected to different conductor layers from each other, among the plurality of conductor layers.

According to a preferred embodiment of the present invention, the first external electrode and the second external electrode are electrically connected to a same conductor layer from among the plurality of conductor layers.

According to a preferred embodiment of the present invention, $Db/Da \geq$ about $0.25$ and $Dd/Dc \geq$ about $0.25$ are satisfied when, in each of the first extension portion and the second extension portion, a line electrically connecting tips of the protrusion portions to each other indicates a first imaginary line, a middle point of the first imaginary line in the laminating direction indicates a first imaginary point, a line extending through the first imaginary point in the direction in which the first side surface and the second side surface are opposed indicates a second imaginary line, a distance is denoted by Da between an intersection of an outer edge of the base portion with the second imaginary line, and the first imaginary point, a distance is denoted by Db between an intersection of an inner edge of the base portion with the second imaginary line, and the first imaginary point, a midpoint indicates a second imaginary point between the intersection of the inner edge of the base portion with the second imaginary line, and the first imaginary point, a line extending through the second imaginary point in the laminating direction indicates a third imaginary line, a distance is denoted by Dc between intersections of outer edges of the respective protrusion portions, with the third imaginary line, and a distance is denoted by Dd between the intersections of inner edges of the respective protrusion portions, with the third imaginary line.

According to a preferred embodiment of the present invention, when the first side surface is viewed from the direction in which the first side surface and the second side surface are opposed, the first external electrode includes a base portion extending along an edge of the first side surface in the laminating direction described above, and protrusion portions extending from both ends of the base portion in the laminating direction along the first side surface and extending in the direction in which the third side surface and the fourth side surface are opposed.

According to a preferred embodiment of the present invention, when the second side surface is viewed from the direction in which the first side surface and the second side surface are opposed, the second external electrode includes a base portion extending along an edge of the second side surface in the laminating direction described above, and protrusion portions extending from both ends of the base portion in the laminating direction along the second side surface and extending in the direction in which the third side surface and the fourth side surface are opposed.

According to a preferred embodiment of the present invention, among the plurality of conductor layers, at least two conductor layers define and function as internal electrodes for a capacitor.

According to a preferred embodiment of the present invention, among the plurality of conductor layers, at least two conductor layers define a coil.

According to a preferred embodiment of the present invention, the component further includes, on the first side surface or the second side surface, an external electrode electrically connected to at least one conductor layer among the plurality of conductor layers.

According to preferred embodiments of the present invention, acoustic noises are able to be significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Multilayer ceramic electronic components according to respective preferred embodiments of the present invention will be described below with reference to the drawings. It is to be noted that the following preferred embodiments represent examples of the present invention for merely illustrative purposes, and that the present invention is not limited to matters disclosed in the following preferred embodiments. The matters disclosed in the different preferred embodiments are able to be combined with each other in practical applications, and modified preferred embodiments in those cases are also included in the scope of the present invention. The drawings serve to assist understanding of the preferred embodiments, and they are not always exactly drawn in a strict sense. In the following explanation of the preferred embodiments, like or corresponding elements or features in the figures will be denoted by like symbols, and the explanations of the elements or features will not be repeated. While multilayer ceramic capacitors will be described as the multilayer ceramic electronic component in the respective preferred embodiments of the present invention, the multilayer ceramic electronic component is not limited to any multilayer ceramic capacitor, but may be a multilayer ceramic inductor, a multilayer ceramic thermistor, or the like.

First Preferred Embodiment

Figure 1:
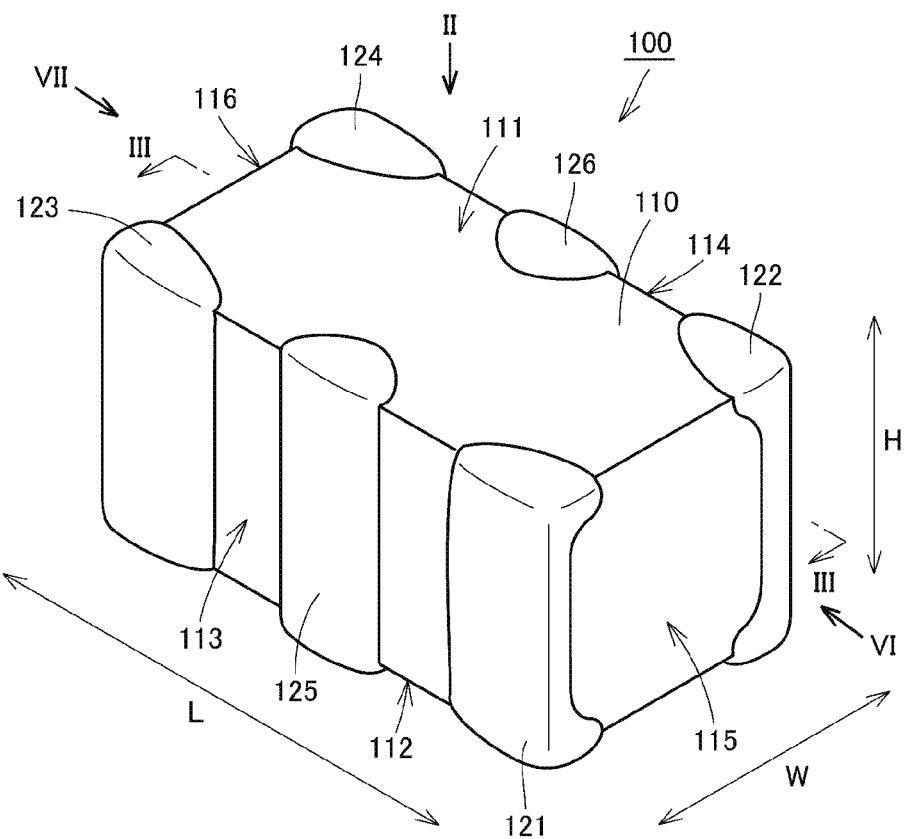
FIG. 1 is a perspective view illustrating the appearance of a multilayer ceramic electronic component according to a first preferred embodiment of the present invention.
Figure 2:
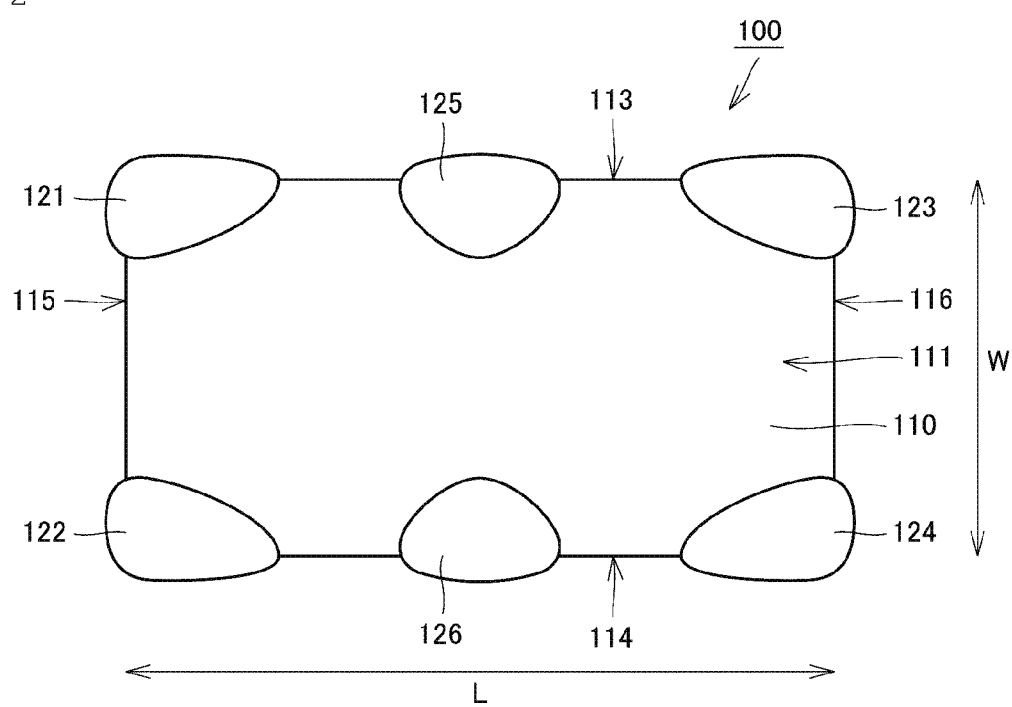
FIG. 2 is a plan view of the multilayer ceramic electronic component in FIG. 1 as viewed from the direction of an arrow II.
Figure 3:
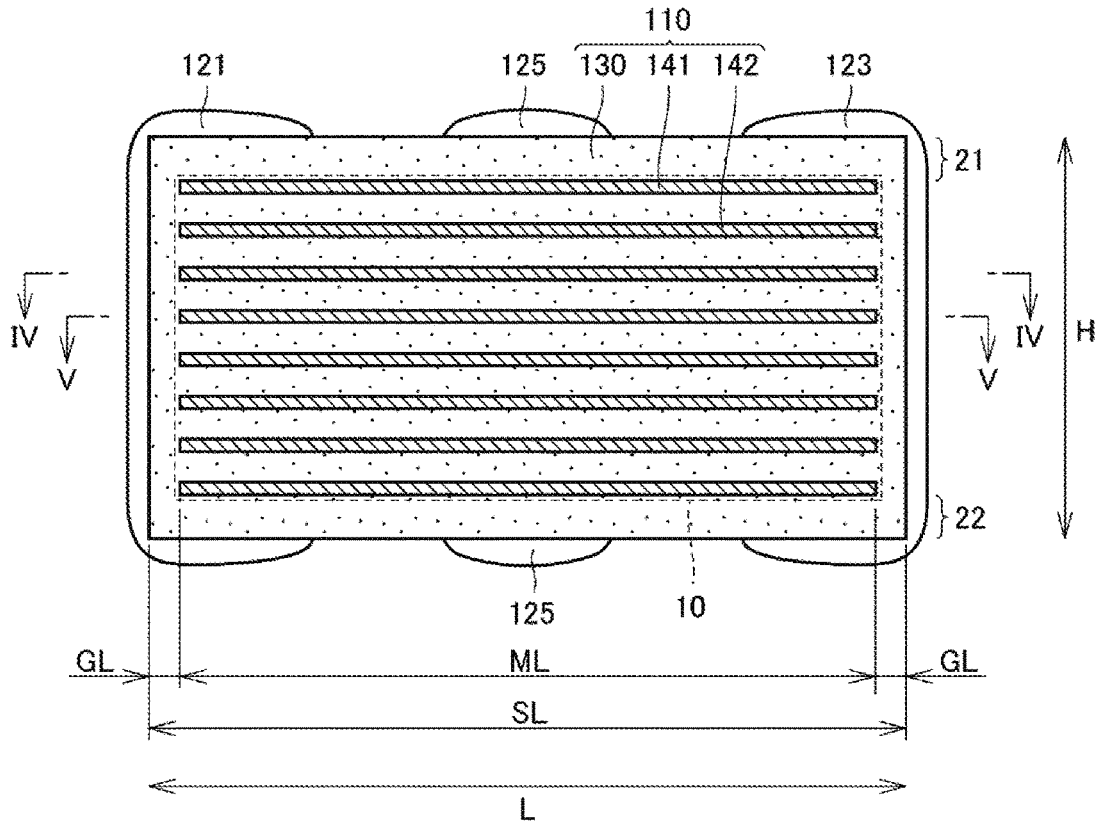
FIG. 3 is a cross-sectional view of the multilayer ceramic electronic component in FIG. 1 as viewed from the direction of III-III arrows.
Figure 4:
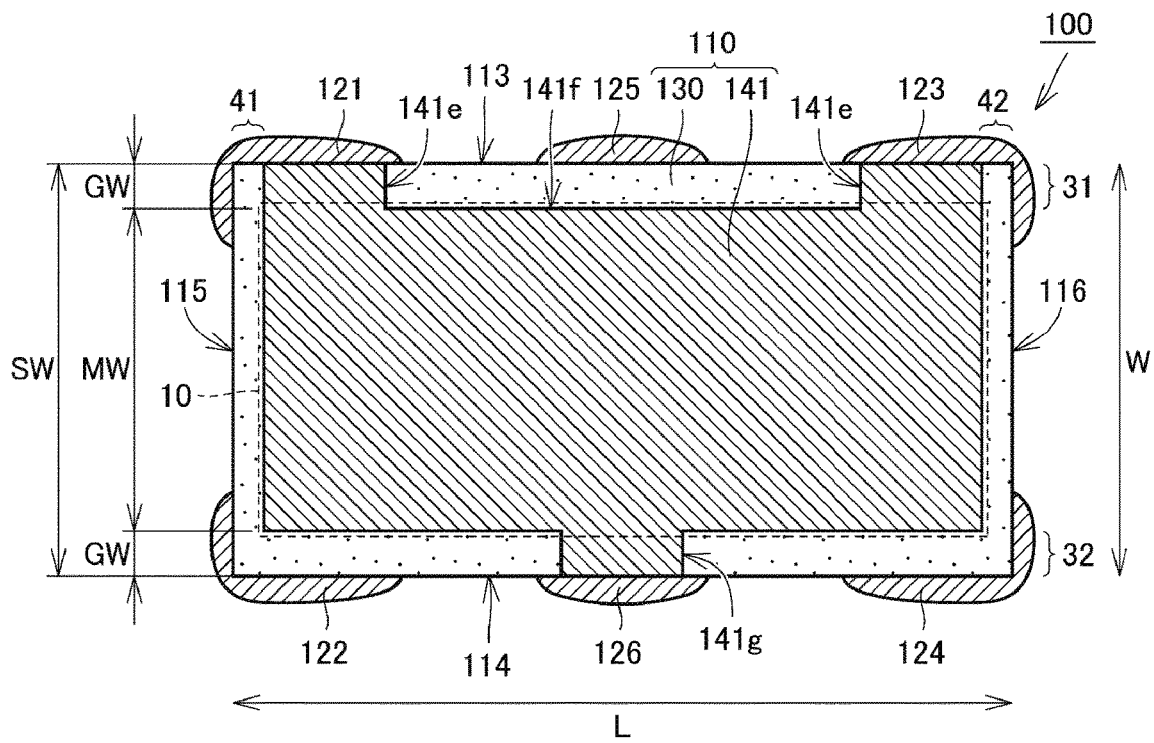
FIG. 4 is a cross-sectional view of the multilayer ceramic electronic component in FIG. 3 as viewed from the direction of IV-IV arrows.
Figure 5:
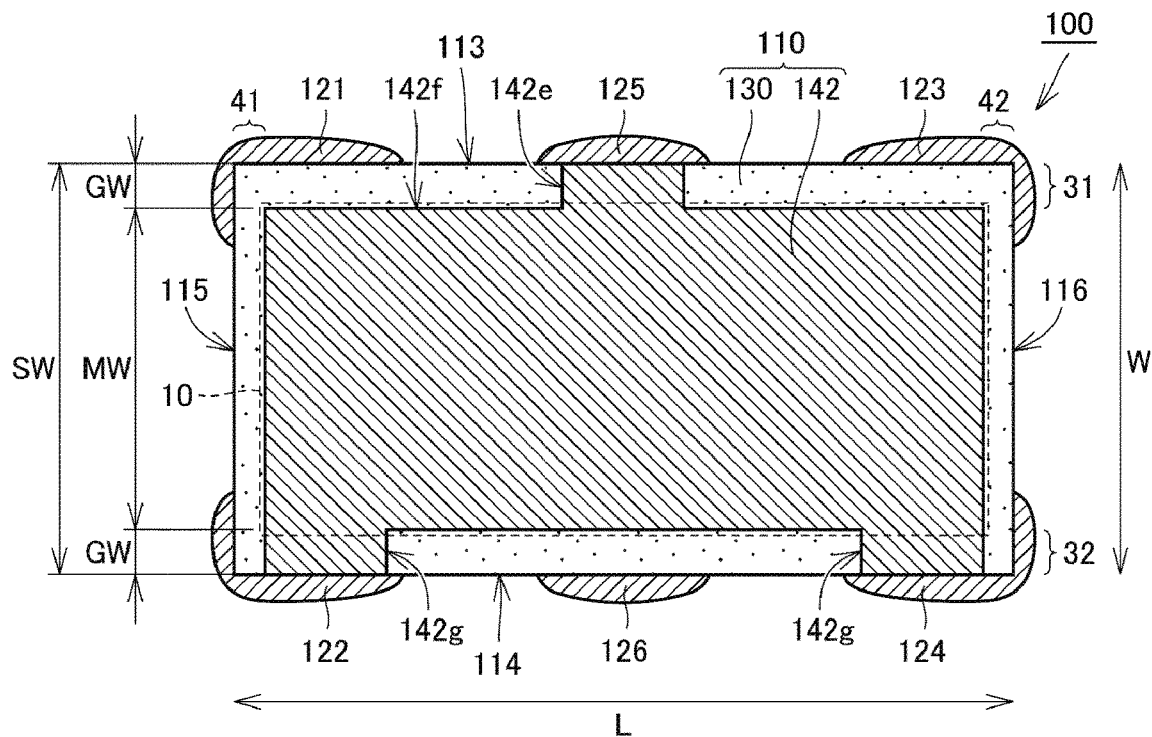
FIG. 5 is a cross-sectional view of the multilayer ceramic electronic component in FIG. 3 as viewed from the direction of V-V arrows.
Figure 6:
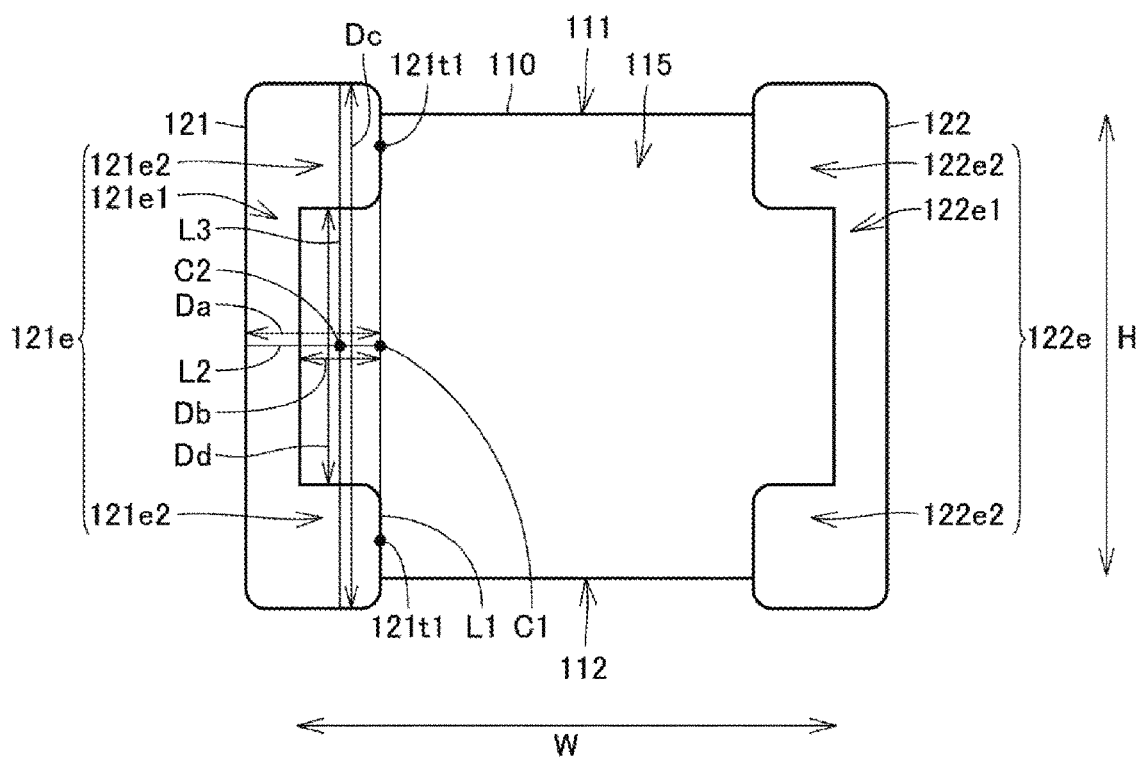
FIG. 6 is a view of the multilayer ceramic electronic component in FIG. 1 as viewed from the direction of an arrow VI.
Figure 7:
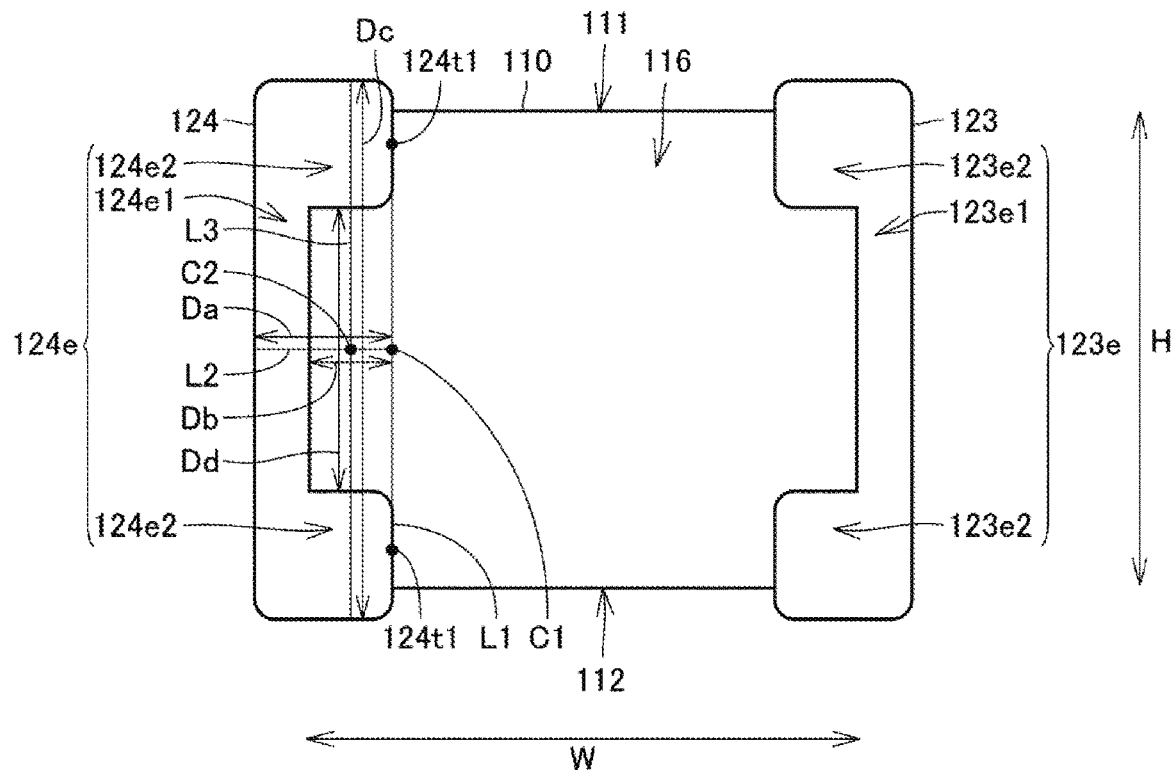
FIG. 7 is a view of the multilayer ceramic electronic component in FIG. 1 as viewed from the direction of an arrow VII.

FIG. 1 is a perspective view illustrating the appearance of a multilayer ceramic electronic component according to a first preferred embodiment of the present invention. FIG. 2 is a plan view of the multilayer ceramic electronic component in FIG. 1 as viewed from the direction of an arrow II. FIG. 3 is a cross-sectional view of the multilayer ceramic electronic component in FIG. 1 as viewed from the direction of III-III arrows. FIG. 4 is a cross-sectional view of the multilayer ceramic electronic component in FIG. 3 as viewed from the direction of IV-IV arrows. FIG. 5 is a cross-sectional view of the multilayer ceramic electronic component in FIG. 3 as viewed from the direction of V-V arrows. FIG. 6 is a view of the multilayer ceramic electronic component in FIG. 1 as viewed from the direction of an arrow VI. FIG. 7 is a view of the multilayer ceramic electronic component in FIG. 1 as viewed from the direction of an arrow VII. In FIGS. 1 to 7, the width direction of a laminated body is denoted by W, the laminating direction of the laminated body is denoted by H, and a direction perpendicular or substantially perpendicular to the W direction as the width direction of the laminated body and the H direction as the laminating direction is denoted by L.

As shown in FIGS. 1 to 7, the multilayer ceramic electronic component 100 according to the first preferred embodiment includes a laminated body 110, and external electrodes provided partially on the surface of the laminated body 110. The laminated body 110 includes a plurality of dielectric layers 130 and a plurality of conductor layers laminated. According to the present preferred embodiment, the dielectric layers 130 and the conductor layers are laminated alternately. The laminated body 110 includes a cuboid or substantially cuboid shape. The H direction of the dielectric layers 130 and conductor layers is perpendicular or substantially perpendicular to the L direction of the laminated body 110 and the W direction of the laminated body 110.

The laminated body 110 includes a first principal surface 111 and a second principal surface 112 opposed to each other in the H direction of the laminated body 110, a first side surface 113 and a second side surface 114 opposed to each other, which extend parallel or substantially parallel to the H direction of the laminated body 110, and a third side surface 115 and a fourth side surface 116 opposed to each other, which extend parallel or substantially parallel to the H direction of the laminated body 110, perpendicular or substantially perpendicular to each of the first side surface 113 and the second side surface 114.

The laminated body 110 includes the cuboid or substantially cuboid outer shape as described above, but preferably includes corners and ridges that are rounded. The corner refers to the intersection of three surfaces of the laminated body 110, and the ridge refers to the intersection of two surfaces of the laminated body 110. At least one of the first principal surface 111, second principal surface 112, first side surface 113, second side surface 114, third side surface 115, and fourth side surface 116 may include a rough edge.

As for the outside dimensions of the multilayer ceramic electronic component 100, for example, the dimension in the L direction is about 2.0 mm or more and about 2.3 mm or less, the dimension in the W direction is about 1.2 mm or more and about 1.55 mm or less, and the dimension in the H direction is about 0.5 mm or more and about 1.0 mm or less. The outside dimensions of the multilayer ceramic electronic component 100 are able to be measured with a micrometer.

According to the present preferred embodiment, the plurality of conductor layers includes first conductor layers 141 and second conductor layers 142 located alternately in the H direction of the laminated body 110. The first conductor layers 141 and the second conductor layers 142 define and function as internal electrodes for a capacitor. It is to be noted that the plurality of conductor layers may include conductor layers different from the first conductor layers 141 and the second conductor layers 142.

The first conductor layers 141 each include a rectangular or substantially rectangular shape as viewed from the H direction of the laminated body 110, and includes an opposed portion 141f opposed to the second conductor layer 142, a first side surface extension portion 141e extended from the opposed portion 141f to the first side surface 113, and a second side surface extension portion 141g extended from the opposed portion 141f to the second side surface 114.

The second conductor layers 142 each include a rectangular or substantially rectangular shape as viewed from the H direction of the laminated body 110, and includes an opposed portion 142f opposed to the first conductor layer 141, a first side surface extension portion 142e extended from the opposed portion 142f to the first side surface 113, and a second side surface extension portion 142g extended from the opposed portion 142f to the second side surface 114.

According to the present preferred embodiment, three external electrodes spaced from each other in the L direction of the laminated body 110 are provided on each of the first side surface 113 and second side surface 114. More specifically, the laminated body 110 is provided with six external electrodes.

Specifically, a first external electrode 121 is provided on a portion of the first side surface 113 closer to the third side surface 115, and a second external electrode 122 is provided on a portion of the second side surface 114 closer to the third side surface 115. A third external electrode 123 is provided on a portion of the first side surface 113 closer to the fourth side surface 116, and a fourth external electrode 124 is provided on a portion of the second side surface 114 closer to the fourth side surface 116. A fifth external electrode 125 is provided on the first side surface 113 between the first external electrode 121 and the third external electrode 123, and a sixth external electrode 126 is provided on the second side surface 114 between the second external electrode 122 and the fourth external electrode 124.

The first external electrode 121 includes a first extension portion 121e that extends to the third side surface 115. When the third side surface 115 is viewed from the direction in which the third side surface 115 and the fourth side surface 116 are opposed, the first extension portion 121e includes a base portion 121e1 extending along an edge of the third side surface 115 in the H direction, and protrusion portions 121e2 extending from both ends of the base portion 121e1 in the H direction along edges of the third side surface 115 in the direction in which the first side surface 113 and the second side surface 114 are opposed. The first external electrode 121 extends further to each of the first principal surface 111 and the second principal surface 112.

The second external electrode 122 includes a second extension portion 122e that extends to the third side surface 115. When the third side surface 115 is viewed from the direction in which the third side surface 115 and the fourth side surface 116 are opposed, the second extension portion 122e includes a base portion 122e1 extending along an edge of the third side surface 115 in the H direction, and protrusion portions 122e2 extending from both ends of the base portion 122e1 in the H direction along edges of the third side surface 115 in the direction in which the first side surface 113 and the second side surface 114 are opposed. The second external electrode 122 extends further to each of the first principal surface 111 and the second principal surface 112.

The third external electrode 123 includes a third extension portion 123e that extends to the fourth side surface 116. When the fourth side surface 116 is viewed from the direction in which the third side surface 115 and the fourth side surface 116 are opposed, the third extension portion 123e includes a base portion 123e1 extending along an edge of the fourth side surface 116 in the H direction, and protrusion portions 123e2 extending from both ends of the base portion 123e1 in the H direction along edges of the fourth side surface 116 in the direction in which the first side surface 113 and the second side surface 114 are opposed. The third external electrode 123 extends further to each of the first principal surface 111 and the second principal surface 112.

The fourth external electrode 124 includes a fourth extension portion 124e that extends to the fourth side surface 116. When the fourth side surface 116 is viewed from the direction in which the third side surface 115 and the fourth side surface 116 are opposed, the fourth extension portion 124e includes a base portion 124e1 extending along an edge of the fourth side surface 116 in the H direction, and protrusion portions 124e2 extending from both ends of the base portion 124e1 in the H direction along edges of the fourth side surface 116 in the direction in which the first side surface 113 and the second side surface 114 are opposed. The fourth external electrode 124 extends further to each of the first principal surface 111 and the second principal surface 112.

The fifth external electrode 125 extends to each of the first principal surface 111 and the second principal surface 112. The sixth external electrode 126 extends to each of the first principal surface 111 and the second principal surface 112.

The first external electrode 121 is electrically connected to the first side surface extension portion 141e of the first conductor layer 141. The second external electrode 122 is electrically connected to the second side surface extension portion 142g of the second conductor layer 142. The third external electrode 123 is electrically connected to the first side surface extension portion 141e of the first conductor layer 141. The fourth external electrode 124 is electrically connected to the second side surface extension portion 142g of the second conductor layer 142. The fifth external electrode 125 is electrically connected to the first side surface extension portion 142e of the second conductor layer 142. The sixth external electrode 126 is electrically connected to the second side surface extension portion 141g of the first conductor layer 141.

More specifically, the first external electrode 121 and the second external electrode 122 are electrically connected to different conductor layers from each other, among the plurality of conductor layers.

The laminated body 110 includes a main portion 10, a first outer layer portion 21, a second outer layer portion 22, a first side portion 31, a second side portion 32, a third side portion 41, and a fourth side portion 42. The main portion 10 refers to a region where the opposed portion s 141f of the first conductor layers 141 and the opposed portions 142f of the second conductor layers 142 are laminated. The first outer layer portion 21 includes the dielectric layer 130 adjacent to or in a vicinity of the main portion 10 in the H direction of the laminated body 110 to define the first principal surface 111, among the plurality of dielectric layers 130. The second outer layer portion 22 includes the dielectric layer adjacent to or in a vicinity of the main portion 10 in the H direction of the laminated body 110 for defining the second principal surface 112, among the plurality of dielectric layers 130.

The first side portion 31 refers to a region between the first side surface 113 and the main portion 10. The second side portion 32 refers to a region between the second side surface 114 and the main portion 10. The third side portion 41 refers to a region between the third side surface 115 and the main portion 10. The fourth side portion 42 refers to a region between the fourth side surface 116 and the main portion 10.

The respective components and elements of the multilayer ceramic electronic component 100 will be described in detail below.

The plurality of dielectric layers 130 included in the main portion 10 is each preferably about 0.5 μm or more and about 3 μm or less in average thickness after firing, for example. The first outer layer portion 21 and the second outer layer portion 22 are each preferably about 10 μm or more and about 80 μm or less in thickness after firing, for example.

Dielectric ceramics containing, as their main component, $BaTiO_3$, $CaTiO_3$, $SrTiO_3$, $CaZrO_3$, or the like are able to be included as a material defining the dielectric layers 130. In addition, to the foregoing main components, a material containing Mn, Mg, Si, Co, Ni, Al, V, or a rare-earth element, or the like may be added as a lower content of accessory component than that of the main component.

It is to be noted that when the multilayer ceramic electronic component is a piezoelectric component, the dielectric layers 130 are able to include a piezoelectric ceramic. Examples of the piezoelectric ceramic include, for example, PZT (lead zirconate titanate) based ceramics.

When the multilayer ceramic electronic component is a thermistor, the dielectric layers 130 are able to include a semiconductor ceramic. Examples of the semiconductor ceramic include, for example, spinel ceramics.

When the multilayer ceramic electronic component is an inductor, the dielectric layers 130 are able to include a magnetic ceramic. Examples of the magnetic ceramic include, for example, ferrite.

The plurality of conductor layers are each preferably about 0.4 μm or more and about 1.0 μm or less in average thickness after firing, for example. Metals such as Ni, Cu, Ag, Pd, and Au, or alloys containing at least one of the metals, for example, an alloy of Ag and Pd are able to be included as a material defining the conductor layers. The conductor layers may further include dielectric grains that are the same as or similar to the ceramic included in the dielectric layers 130.

In the multilayer ceramic electronic component 100, the dimension in the W direction is denoted by GW for each of the first side portion 31 and the second side portion 32, the dimension in the L direction is denoted by GL for each of the third side portion 41 and the fourth side portion 42, the dimension of the laminated body 110 in the L direction is denoted by SL, the dimension of the laminated body 110 in the W direction is denoted by SW, the dimension of the main portion 10 in the L direction is denoted by ML, and the dimension of the main portion 10 in the W direction is denoted by MW.

The GW is preferably about 10 μm or more and about 70 μm or less, more preferably about 55 μm or less, and further preferably about 40 μm or less in average dimension, for example. The GL is preferably about 10 m or more and about 70 μm or less, more preferably about 55 μm or less, and further preferably about 40 μm or less in average dimension, for example.

The reliability of the multilayer ceramic electronic component 100 is significantly improved by ensuring the large GW and GL dimensions. As the GW and GL dimensions are increased, the electrostatic capacitance of the multilayer ceramic electronic component 100 is reduced. As the GW dimension is reduced, the equivalent series inductance (ESL) of the multilayer ceramic electronic component 100 is reduced.

The first external electrode 121 through the sixth external electrodes 126 each include a base electrode layer, and a plating layer located on the base electrode layer. The base electrode layer includes at least one of a baked layer and a thin film layer. The base electrode layer is preferably about 10 μm or more and about 50 μm or less, more preferably about 25 μm or less, and further preferably about 15 μm or less in thickness, for example.

The baked layer includes glass and a metal. The metal material defining the baked layer is one metal selected from the group consisting of Ni, Cu, Ag, Pd, and Au, or an alloy containing the metal, and for example, an alloy of Ag and Pd are able to be included. The glass contains Si and Zn. The baked layer may include multiple layers laminated. The baked layer may be a layer obtained by applying a conductive paste to the laminated body 110 and baking the paste, or a layer subjected to co-firing with the conductor layers.

The thin film layer is defined by a thin-film formation method, for example, a sputtering method or a vapor deposition method. The thin film layer is a layer of about 1 μm or less that includes metal particles, for example.

The material defining the plating layer includes one metal selected from the group consisting of Ni, Cu, Ag, Pd, and Au, or an alloy containing the metal, and for example, an alloy of Ag and Pd are able to be included.

The plating layer may include multiple layers laminated. In this case, the plating layer preferably includes a two-layer structure with a Sn plating layer provided on a Ni plating layer. The Ni plating layer significantly reduces or prevents the base electrode layer from being eroded by solder to mount the multilayer ceramic electronic component. The Sn plating layer significantly improves the wettability to the solder for mounting the multilayer ceramic electronic component, and thus the multilayer ceramic electronic component is able to be easily mounted.

The Ni plating layer is preferably about 0.5 μm or more and about 10 μm or less, more preferably about 4.5 μm or less, and further preferably about 3.7 μm or less in average thickness, for example. The Sn plating layer is preferably about 0.5 μm or more and about 10 m or less, more preferably about 4.5 μm or less, and further preferably about 3.7 μm or less in average thickness, for example.

As shown in FIG. 6, in the first extension portion 121e, the line electrically connecting tips 121t1 of the protrusion portions 121e2 to each other indicates a first imaginary line L1. The middle point of the first imaginary line L1 in the H direction indicates a first imaginary point C1. The line extending through the first imaginary point C1 in a direction in which the first side surface 113 and the second side surface 114 are opposed indicates a second imaginary line L2. The distance is denoted by Da between the intersection of an outer edge of the base portion 121e1 with the second imaginary line L2, and the first imaginary point C1. The distance is denoted by Db between the intersection of an inner edge of the base portion 121e1 with the second imaginary line L2, and the first imaginary point C1.

The midpoint indicates a second imaginary point C2 between the intersection of the inner edge of the base portion 121e1 with the second imaginary line L2, and the first imaginary point C1. The line extending through the second imaginary point C2 in the H direction indicates a third imaginary line L3. The distance is denoted by Dc between the intersections of outer edges of the respective protrusion portions 121e2, with the third imaginary line L3. The distance is denoted by Dd between the intersections of inner edges of the respective protrusion portions 121e2, with the third imaginary line L3.

The shape of the first extension portion 121e satisfies Db/Da≥about 0.25 and Dd/Dc≥about 0.25. It is to be noted that the tips 121t1 of the protrusion portions 121e2 refer to tips of portions of the protrusion portions 121e2, which are located on the third side surface 115, but the tips are not located on ridges.

The second extension portion 122e also includes a same or a similar shape as the shape of the first extension portion 121e.

As shown in FIG. 7, in the fourth extension portion 124e, the line electrically connecting tips 124t1 of the protrusion portions 124e2 to each other indicates a first imaginary line L1. The middle point of the first imaginary line L1 in the H direction indicates a first imaginary point C1. The line extending through the first imaginary point C1 in a direction in which the first side surface 113 and the second side surface 114 are opposed indicates a second imaginary line L2. The distance is denoted by Da between the intersection of an outer edge of the base portion 124e1 with the second imaginary line L2, and the first imaginary point C1. The distance is denoted by Db between the intersection of an inner edge of the base portion 124e1 with the second imaginary line L2, and the first imaginary point C1.

The midpoint indicates a second imaginary point C2 between the intersection of the inner edge of the base portion 124e1 with the second imaginary line L2, and the first imaginary point C1. The line extending through the second imaginary point C2 in the H direction indicates a third imaginary line L3. The distance is denoted by Dc between the intersections of outer edges of the respective protrusion portions 124e2, with the third imaginary line L3. The distance is denoted by Dd between the intersections of inner edges of the respective protrusion portions 124e2, with the third imaginary line L3.

The shape of the fourth extension portion 124e satisfies Db/Da≥about 0.25 and Dd/Dc≥about 0.25. It is to be noted that the tips 124t1 of the protrusion portions 124e2 refer to tips of portions of the protrusion portions 124e2, which are located on the fourth side surface 116, but the tips are not located on ridges.

The third extension portion 123e also includes a same or a similar shape as the shape of the fourth extension portion 124e.

A non-limiting example of a method for manufacturing the multilayer ceramic electronic component 100 according to the present preferred embodiment will be described below. It is to be noted that the following method for manufacturing a multilayer ceramic electronic component is a method for simultaneously producing a plurality of multilayer ceramic electronic components 100 in large quantities by preparing a mother laminated body through processing treatment collectively up to a mid-stage of the manufacturing process, thereafter dividing the mother laminated body into individual bodies, and further applying processing treatment to the divided soft laminated bodies.

For manufacturing the multilayer ceramic electronic component 100, first, a ceramic slurry is prepared. Specifically, a ceramic powder, a binder, and a solvent, and the like are mixed in predetermined blending proportions, thus providing the ceramic slurry.

Next, ceramic green sheets are formed. Specifically, the ceramic slurry is formed into a sheet on a carrier film by a die coater, a gravure coater, a micro-gravure coater, or the like, thus forming ceramic green sheets.

Next, mother sheets are formed. Specifically, a conductive paste is applied by printing to the ceramic green sheets by a screen printing method, a gravure printing method, or the like to provide predetermined patterns, thus forming mother sheets with predetermined conductive patterns on the ceramic green sheets.

Further, as mother sheets, the ceramic green sheets without any conductive pattern are also prepared in addition to the mother sheets with the conductive patterns.

Next, mother sheets are stacked. Specifically, a group of mother sheets is provided by stacking the mother sheets without any conductive pattern, which define the first outer layer portion 21, to reach a predetermined number of sheets, sequentially stacking thereon the multiple mother sheets with the conductive patterns, which define the main portion 10, and stacking thereon the mother sheets without any conductive pattern, which define the second outer layer portion 22.

Next, the group of mother sheets is subjected to pressure bonding. The group of mother sheets is subjected to pressure bonding by applying a pressure to the group in the stacking direction through isostatic press or rigid press, thus forming a mother laminated body.

Next, the mother laminated body is divided. Specifically, the mother laminated body is divided into a matrix by cutting by pushing, or cutting with a dicing machine, thus providing a plurality of individual soft laminated bodies.

Next, the soft laminated bodies are subjected to barrel polishing. Specifically, the soft laminated bodies are encapsulated in a small box referred to as a barrel, along with media balls that are higher in hardness than the ceramic material, and the barrel is rotated, thereby providing the outer surfaces (in particular, corners and ridges) of the soft laminated bodies with rounded curved surfaces.

Next, the soft laminated bodies are subjected to firing. Specifically, the soft laminated bodies are heated to a predetermined temperature, thus firing the ceramic dielectric material. The firing temperature is set appropriately depending on the type of the ceramic dielectric material, and for example, set within the range of about 900° C. or higher and about 1300° C. or lower.

Next, base electrode layers are formed on the surface of the laminated body. Specifically, the base electrode layers for external electrodes are formed by various types of thin-film formation methods, various types of printing methods, or a dip method or the like. For example, in the case of forming the base electrode layers by a thin-film formation method, thin films that define and function as the base electrode layers are formed with the laminated body surface masked. In the case of forming the base electrode layers by a printing method, a conductive material that defines and functions as the base electrode layers is applied by printing to the surface of the laminated body in accordance with a printing pattern in a predetermined shape. In the case of forming the base electrode layers by a dip method, a conductive paste is provided on the surface of the laminated body by a slit plate or a roller with depressions located at the surface. The conductive paste includes an organic solvent, metal particles, and glass.

Figure 8:
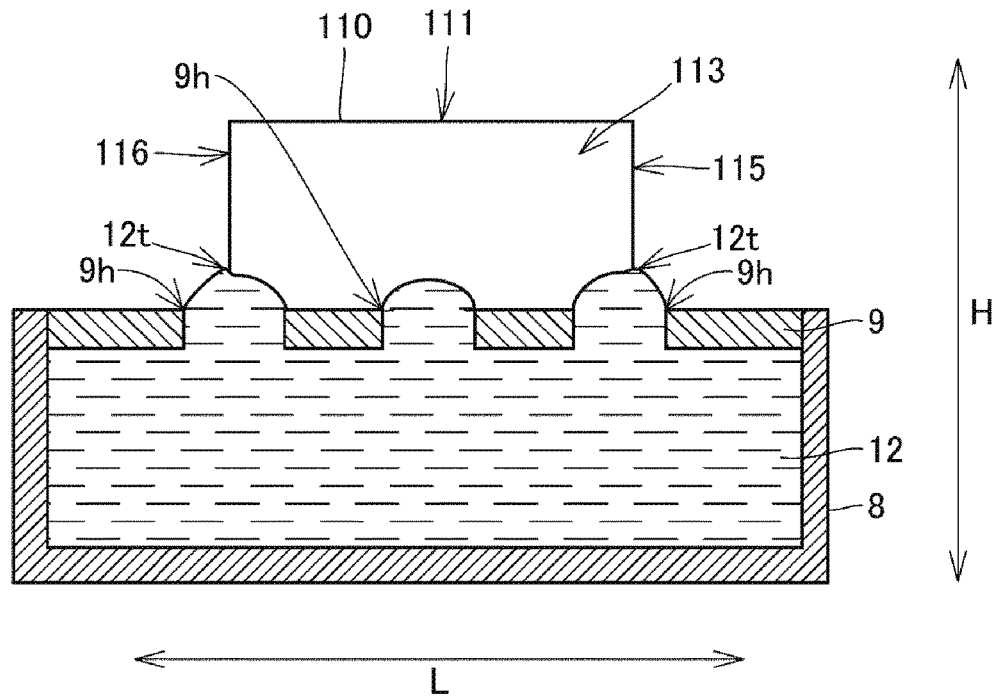
FIG. 8 is a partial cross-sectional view illustrating the formation of a base electrode layer by a dip method.

FIG. 8 is a partial cross-sectional view illustrating the formation of a base electrode layer by a dip method. As shown in FIG. 8, a slit plate 9 provided with slits 9h is located at the liquid level of a conductive paste 12 stored in a tank 8. The conductive paste 12 bulges from the slits 9h. The laminated body 110 is located on the slid plate 9, thus allowing the conductive paste 12 bulging from the slits 9h to be provided on the surface of the laminated body 110. With the laminated body 110 located on the slit plate 9, the third side surface 115 and the fourth side surface 116 are each located on an inner position with respect to the groove width of the corresponding slit 9h in the L direction. Therefore, portions 12t of the conductive paste 12 provided on each of the first side surface 113 and the second side surface 114 are further provided to wrap around each of the third side surface 115 and the fourth side surface 116. The wraparound portions 12t of the conductive paste 12 define and function as base electrode layers at protrusion portions.

Next, plating layers are formed by plating treatment to cover the base electrode layers. The formation of the plating layers defines external electrodes.

The multilayer ceramic electronic component 100 is manufactured through the series of steps described above.

When a voltage is applied to the multilayer ceramic electronic component 100, respective central portions of the first side surface 113, second side surface 114, third side surface 115, and fourth side surface 116 of the laminated body 110 are repeatedly strained in accordance with the period of the voltage applied. The strain vibration propagates to a substrate on which the multilayer ceramic electronic component 100 is mounted, thus generating acoustic noises.

In the case of the multilayer ceramic electronic component 100 according to the present preferred embodiment, the first extension portion 121e of the first external electrode 121 includes the base portion 121e1 and the protrusion portions 121e2, and the first extension portion 121e is provided at the location spaced away from the central portion of the third side surface 115. The second extension portion 122e of the second external electrode 122 includes the base portion 122e1 and the protrusion portions 122e2, and the second extension portion 122e is spaced away from the central portion of the third side surface 115. Thus, the strain vibration generated at the third side surface 115 is able to be significantly reduced or prevented from propagating to the substrate through a solder that electrically connects the first external electrode 121 and the second external electrode 122 to the substrate. As a result, the multilayer ceramic electronic component 100 is able to reduce acoustic noises.

Likewise, in the case of the multilayer ceramic electronic component 100, the third extension portion 123e of the third external electrode 123 includes the base portion 123e1 and the protrusion portions 123e2, and the third extension portion 123e is spaced away from the central portion of the fourth side surface 116. The fourth extension portion 124e of the fourth external electrode 124 includes the base portion 124e1 and the protrusion portions 124e2, and the fourth extension portion 124e is spaced away from the central portion of the fourth side surface 116. Thus, the strain vibration generated at the fourth side surface 116 is able to be significantly reduced or prevented from propagating to the substrate through a solder that electrically connects the third external electrode 123 and the fourth external electrode 124 to the substrate. As a result, the multilayer ceramic electronic component 100 is able to significantly reduce or prevent acoustic noises.

Experimental Example

An experimental example will be described which examined the relationship between Db/Da and Dd/Dc and the reduction or prevention of acoustic noise in the respective shapes of the first extension portion 121e, second extension portion 122e, third extension portion 123e, and fourth extension portion 124e.

Figure 9:
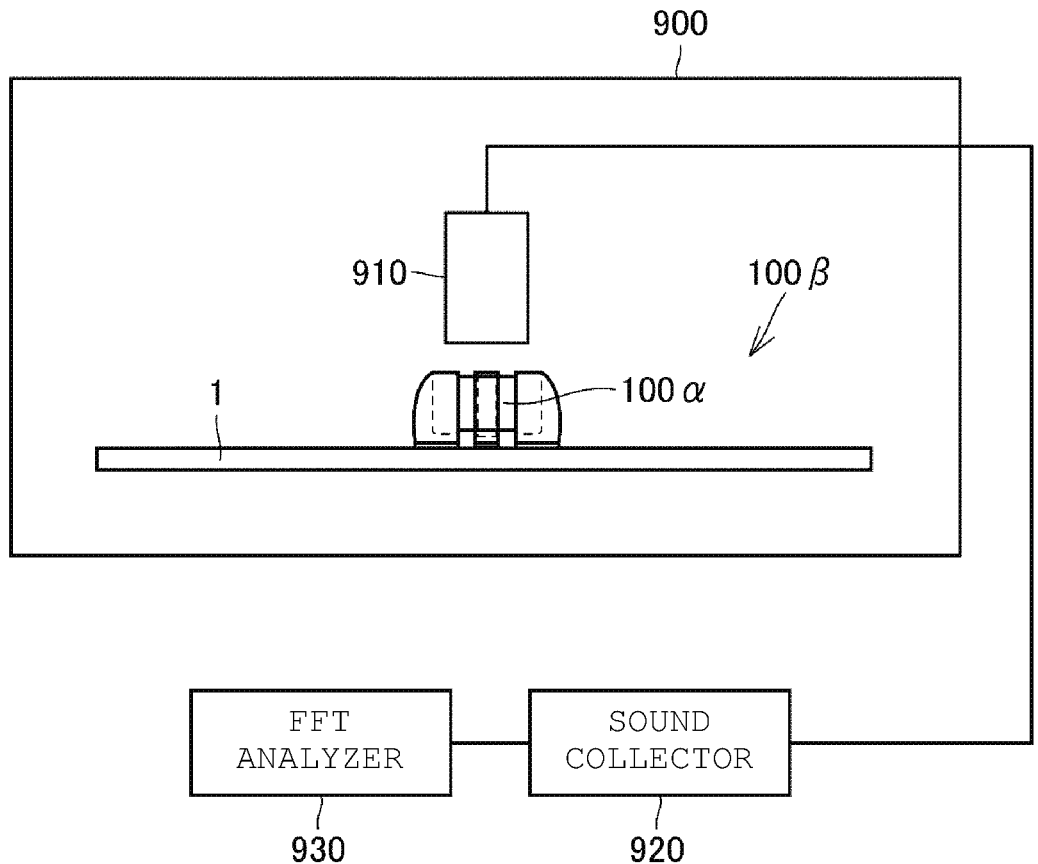
FIG. 9 is a schematic diagram illustrating a method for measuring the sound pressure of an acoustic noise according to an experimental example.

FIG. 9 is a schematic diagram illustrating a method for measuring the sound pressure of an acoustic noise according to the experimental example. As shown in FIG. 9, for measuring the sound pressure of an acoustic noise, first, a multilayer ceramic electronic component 100a was mounted onto a substrate 1 under the conditions of heating temperature: about 260° C. and holding time: about 15 seconds by a solder including Sn-3Ag-0.5Cu, thus providing a mounted body 100β. The mounted body 100β was set up in an anechoic box 900, and in this condition, a direct-current voltage of about 3.7 V and an alternating-current voltage of about 1.0 Vpp in a frequency band of about 1.5 kHz to about 20 kHz were applied to the multilayer ceramic electronic component 100a, and the total sound pressure level of acoustic noise generated in that case was measured.

It is to be noted that for the measurement of the total sound pressure level of acoustic noise, a sound collecting microphone 910 was located about 3 mm above the mounted body 100R in the anechoic box 900, sounds produced from the mounted body 100β were collected by the sound collecting microphone 910 and a sound collector 920, and the collected sounds were analyzed by a FFT (Fast Fourier Transform) analyzer 930 (CF-5220 from ONO SOKKI Co., Ltd.).

As samples of the multilayer ceramic electronic component 100α, three samples were prepared for each of ten types of samples according to Comparative Examples 1 and 2 and Examples 1 to 8. In the ten types of samples according to Comparative Examples 1 and 2 and Examples 1 to 8, the materials defining the dielectric layer 130 contain a barium titanate as their main component, and include Mg, V, Dy, and Si added as accessory components.

The multilayer ceramic electronic components according to Comparative Example 1 and Examples 1 to 4 were prepared in accordance with the following conditions. The external dimensions were adjusted to about 1.17 mm in the L direction, about 0.62 mm in the W direction, and about 0.4 mm in the H direction. The plurality of dielectric layers 130 included in the main portion 10 was each adjusted to about 0.7 μm in average thickness. The number of conductor layers laminated was adjusted to 250. The plurality of conductor layers was each adjusted to about 0.5 μm in average thickness. The average dimension of GW was adjusted to about 50 μm. The average dimension of GL was adjusted to about 50 μm. The firing temperature was adjusted to about 1200° C. As each of first to sixth external electrodes, with the laminated body surface masked, a Ni—Cr thin film of about 0.3 μm in average thickness was provided by a sputtering method as a base electrode layer, and as a plating layer, a Cu plating layer of about 4 μm in average thickness, a Ni plating layer of about 4 μm in average thickness, and a Sn plating layer of about 4 μm in average thickness were provided in this order on the base electrode layer.

TABLE 1

| | Da (mm) | Dc (mm) | Db/Da | Dd/Dc | Reduction Ratio of Acoustic Noise (%) |
|---|---|---|---|---|---|
| Comparative Example 1 | 0.15 | 0.4 | 0 | 0 | 0 |
| Example 1 | 0.15 | 0.4 | 0.33 | 0.75 | −5.0 |
| Example 2 | 0.15 | 0.4 | 0.67 | 0.25 | −5.3 |
| Example 3 | 0.15 | 0.4 | 0.67 | 0.50 | −6.3 |
| Example 4 | 0.15 | 0.4 | 0.67 | 0.75 | −10.3 |

Table 1 summarizes the shapes of the first extension portion 121e, second extension portion 122e, third extension portion 123e, and fourth extension portion 124e for each of the multilayer ceramic electronic components according to Comparative Example 1 and Examples 1 to 4, and the reduction ratios of acoustic noise in Examples 1 to 4 to that in Comparative Example 1. The reduction ratio of acoustic noise was obtained by calculating the average value for three samples.

As shown in Table 1, the multilayer ceramic electronic components according to Comparative Example 1 and Examples 1 to 4 included Da (average value)=about 0.15 mm and Dc (average value)=about 0.4 mm. The ratio Db/Da was adjusted to about 0 according to Comparative Example 1, about 0.33 according to Example 1, about 0.67 according to Example 2, about 0.67 according to Example 3, and about 0.67 according to Example 4. The ratio Dd/Dc was adjusted to about 0 according to Comparative Example 1, about 0.75 according to Example 1, about 0.25 according to Example 2, about 0.50 according to Example 3, and about 0.75 according to Example 4. The reduction ratio of acoustic noise was about 0 in Comparative Example 1, about −5.0% in Example 1, about −5.3% in Example 2, about −6.3% in Example 3, and about −10.3% in Example 4.

The multilayer ceramic electronic components according to Comparative Example 2 and Examples 5 to 8 were prepared in accordance with the following conditions. The external dimensions were adjusted to about 0.62 mm in the L direction, about 0.32 mm in the W direction, and about 0.32 mm in the H direction. The plurality of dielectric layers 130 included in the main portion 10 was each adjusted to about 0.7 μm in average thickness. The number of conductor layers laminated was adjusted to 220. The plurality of conductor layers was each adjusted to about 0.5 μm in average thickness. The average dimension of GW was adjusted to about 40 μm. The average dimension of G was adjusted to about 40 μm. The firing temperature was adjusted to about 1200° C. As each of first to sixth external electrodes, with the laminated body surface masked, a Ni—Cr thin film of about 0.3 μm in average thickness was provided by a sputtering method as a base electrode layer, and as a plating layer, a Cu plating layer of about 4 μm in average thickness, a Ni plating layer of about 4 μm in average thickness, and a Sn plating layer of about 4 μm in average thickness were provided in this order on the base electrode layer.

TABLE 2

| | Da (mm) | Dc (mm) | Db/Da | Dd/Dc | Reduction Ratio of Acoustic Noise (%) |
|---|---|---|---|---|---|
| Comparative Example 2 | 0.08 | 0.32 | 0 | 0 | 0 |
| Example 5 | 0.08 | 0.32 | 0.25 | 0.63 | −3.2 |
| Example 6 | 0.08 | 0.32 | 0.44 | 0.31 | −4.2 |
| Example 7 | 0.08 | 0.32 | 0.63 | 0.31 | −5.5 |
| Example 8 | 0.08 | 0.32 | 0.63 | 0.63 | −7.5 |

Table 2 summarizes the shapes of the first extension portion 121e, second extension portion 122e, third extension portion 123e, and fourth extension portion 124e for each of the multilayer ceramic electronic components according to Comparative Example 2 and Examples 5 to 8, and the reduction ratios of acoustic noise in Examples 5 to 8 to that in Comparative Example 2. The reduction ratio of acoustic noise was obtained by calculating the average value for three samples.

As shown in Table 2, the multilayer ceramic electronic components according to Comparative Example 2 and Examples 5 to 8 included Da (average value)=about 0.08 mm and Dc (average value)=about 0.32 mm. The ratio Db/Da was adjusted to about 0 according to Comparative Example 2, about 0.25 according to Example 5, about 0.44 according to Example 6, about 0.63 according to Example 7, and about 0.63 according to Example 8. The ratio Dd/Dc was adjusted to about 0 according to Comparative Example 2, about 0.63 according to Example 5, about 0.31 according to Example 6, about 0.31 according to Example 7, and about 0.63 according to Example 8. The reduction ratio of acoustic noise was about 0 in Comparative Example 2, about −3.2% in Example 5, about −4.2% in Example 6, about −5.5% in Example 7, and about −7.5% in Example 8.

As shown in Tables 1 and 2, the reduction ratio of acoustic noise is increased as each of the ratios Db/Da and Dd/Dc is increased. Accordingly, it was successfully confirmed that acoustic noises are significantly reduced or prevented when each of the ratios Db/Da and Dd/Dc is about 0.25 or more.

Figure 10:
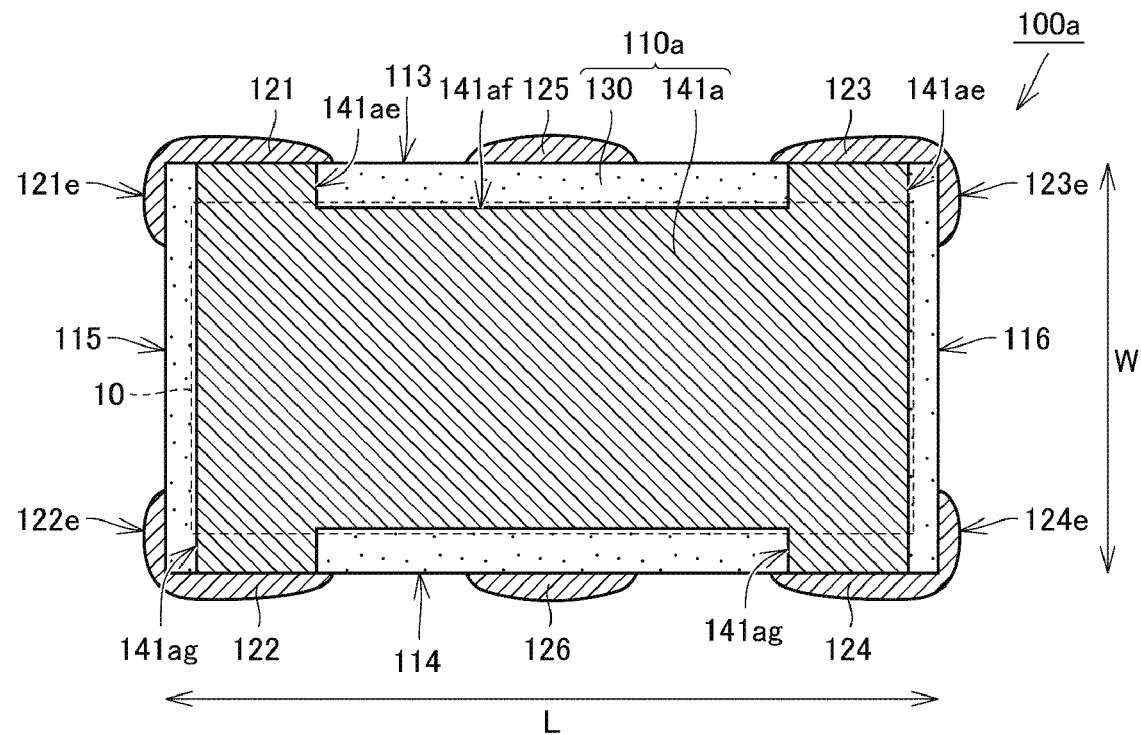
FIG. 10 is a cross-sectional view illustrating a multilayer ceramic electronic component according to a first modification example of the first preferred embodiment of the present invention in a same cross-sectional view as FIG. 4.
Figure 11:
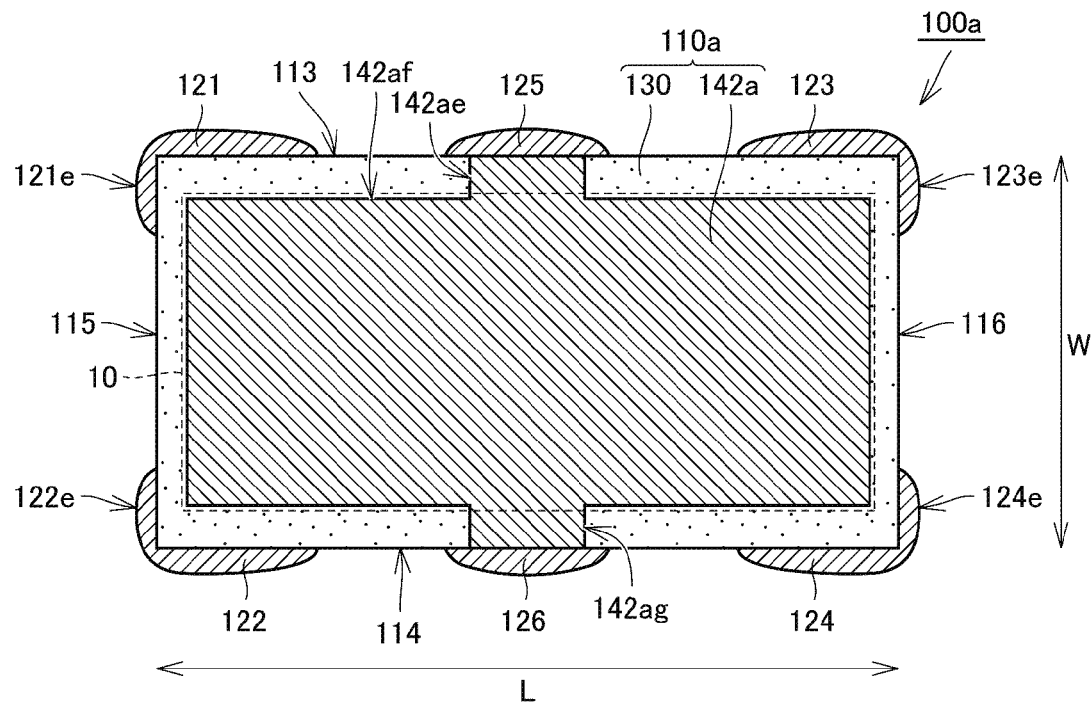
FIG. 11 is a cross-sectional view illustrating the multilayer ceramic electronic component according to the first modification example of the first preferred embodiment of the present invention in a same cross-sectional view as FIG. 5.

A multilayer ceramic electronic component according to a first modification example of the first preferred embodiment of present invention will be described below. FIG. 10 is a cross-sectional view illustrating a multilayer ceramic electronic component according to a first modification example of the first preferred embodiment in a same cross-sectional view as FIG. 4. FIG. 11 is a cross-sectional view illustrating the multilayer ceramic electronic component according to the first modification example of the first preferred embodiment in a same cross-sectional view as FIG. 5.

As shown in FIGS. 10 and 11, a laminated body 110a of the multilayer ceramic electronic component 100a according to the first modification example of the first preferred embodiment includes a first conductor layer 141a and a second conductor layer 142a.

The first conductor layers 141a includes a rectangular or substantially rectangular shape as viewed from the H direction of the laminated body 110a, and includes an opposed portion 141af opposed to the second conductor layer 142a, a first side surface extension portion 141ae extended from the opposed portion 141af to the first side surface 113, and a second side surface extension portion 141ag extended from the opposed portion 141af to the second side surface 114.

The second conductor layers 142a includes a rectangular or substantially rectangular shape as viewed from the H direction of the laminated body 110a, and includes an opposed portion 142af opposed to the first conductor layer 141a, a first side surface extension portion 142ae extended from the opposed portion 142af to the first side surface 113, and a second side surface extension portion 142ag extended from the opposed portion 142af to the second side surface 114.

The first external electrode 121 is electrically connected to the first side surface extension portion 141ae of the first conductor layer 141a. The second external electrode 122 is electrically connected to the second side surface extension portion 141ag of the first conductor layer 141a. The third external electrode 123 is electrically connected to the first side surface extension portion 141ae of the first conductor layer 141a. The fourth external electrode 124 is electrically connected to the second side surface extension portion 141ag of the first conductor layer 141a. The fifth external electrode 125 is electrically connected to the first side surface extension portion 142ae of the second conductor layer 142a. The sixth external electrode 126 is electrically connected to the second side surface extension portion 142ag of the second conductor layer 142a.

More specifically, the first external electrode 121 and the second external electrode 122 are electrically connected to a same conductor layer from among the plurality of conductor layers.

Figure 12:
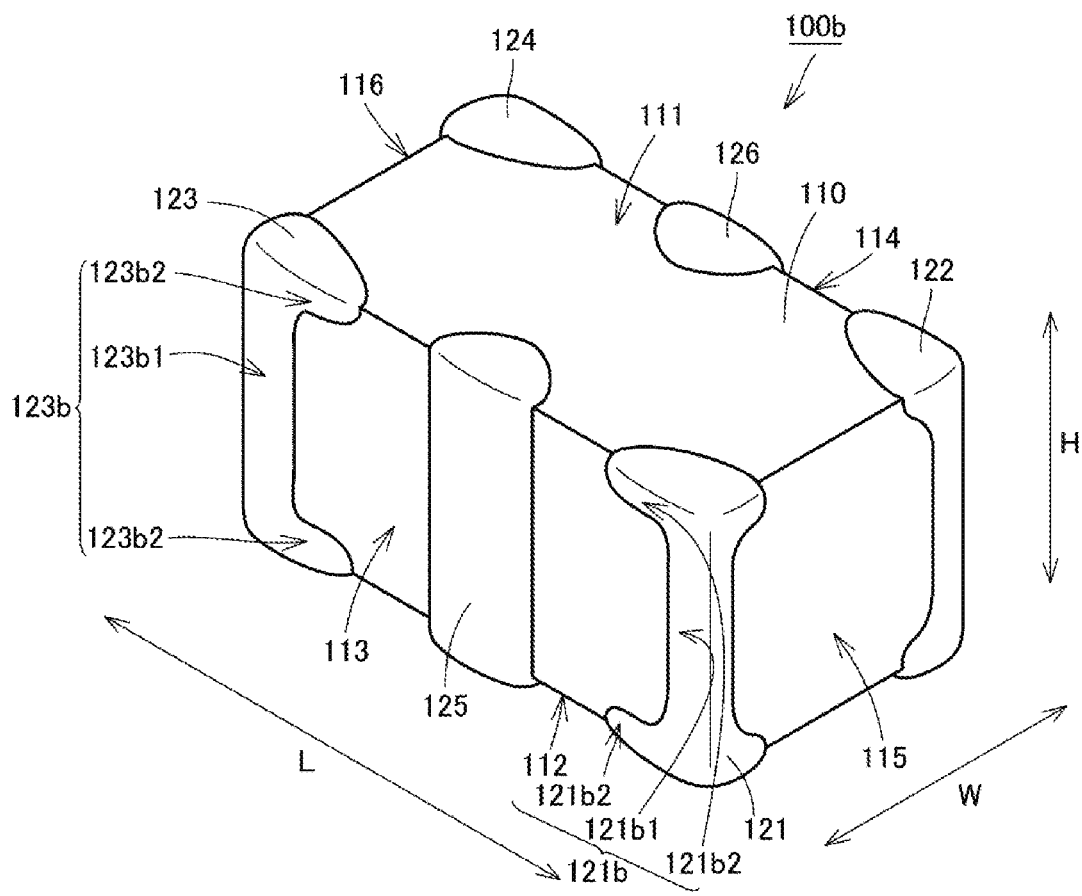
FIG. 12 is a perspective view illustrating the appearance of a multilayer ceramic electronic component according to a second modification example of the first preferred embodiment of the present invention.

A multilayer ceramic electronic component according to a second modification example of the first preferred embodiment of present invention will be described below. FIG. 12 is a perspective view illustrating the appearance of a multilayer ceramic electronic component according to a second modification example of the first preferred embodiment.

As shown in FIG. 12, in the case of a multilayer ceramic electronic component 100b according to the second modification example of the first preferred embodiment of the present invention, when a first side surface 113 is viewed from the direction in which the first side surface 113 and a second side surface 114 are opposed, a main body portion 121b of a first external electrode 121 includes a base portion 121b1 extending along an edge of the first side surface 113 in the H direction, and protrusion portions 121b2 extending from both ends of the base portion 121b1 in the H direction along edges of the first side surface 113 in the direction in which a third side surface 115 and a fourth side surface 116 are opposed.

Likewise, when the second side surface 114 is viewed from the direction in which the first side surface 113 and the second side surface 114 are opposed, a main body portion of a second external electrode 122 includes a base portion extending along an edge of the second side surface 114 in the H direction, and protrusion portions extending from both ends of the base portion in the H direction along edges of the second side surface 114 in the direction in which the third side surface 115 and the fourth side surface 116 are opposed.

Likewise, when the first side surface 113 is viewed from the direction in which the first side surface 113 and the second side surface 114 are opposed, a main body portion 123b of a third external electrode 123 includes a base portion 123b1 extending along an edge of the first side surface 113 in the H direction, and protrusion portions 123b2 extending from both ends of the base portion 123b1 in the H direction along edges of the first side surface 113 in the direction in which the third side surface 115 and the fourth side surface 116 are opposed.

Likewise, when the second side surface 114 is viewed from the direction in which the first side surface 113 and the second side surface 114 are opposed, a main body portion of a fourth external electrode 124 includes a base portion extending along an edge of the second side surface 114 in the H direction, and protrusion portions extending from both ends of the base portion in the H direction along edges of the second side surface 114 in the direction in which the third side surface 115 and the fourth side surface 116 are opposed.

In the case of the multilayer ceramic electronic component 100b according to the present modification example, the main body portion 121b of the first external electrode 121 includes the base portion 121b1 and the protrusion portion 121b2, and the main body portion 121b is provided in a location away from a central portion of the first side surface 113. The main body portion 123b of the third external electrode 123 includes the base portion 123b1 and the protrusion portion 123b2, and the main body portion 123b is provided in a location away from the central portion of the first side surface 113. Thus, the strain vibration generated at the first side surface 113 is able to be significantly reduced or prevented from propagating to the substrate through a solder that electrically connects the first external electrode 121 and the third external electrode 123 to the substrate. As a result, the multilayer ceramic electronic component 100b is able to significantly reduce or prevent acoustic noises.

Likewise, in the case of the multilayer ceramic electronic component 100b, the main body portion of the second external electrode 122 includes the base portion and the protrusion portion, and the main body portion is provided in a location away from a central portion of the second side surface 114. The main body portion of the fourth external electrode 124 includes the base portion and the protrusion portion, and the main body portion is provided in a location away from the central portion of the second side surface 114. Thus, the strain vibration generated at the second side surface 114 is able to be significantly reduced or prevented from propagating to the substrate through a solder that electrically connects the second external electrode 122 and the fourth external electrode 124 to the substrate. As a result, the multilayer ceramic electronic component 100b is able to significantly reduce or prevent acoustic noises.

Second Preferred Embodiment

A multilayer ceramic electronic component according to a second preferred embodiment of the present invention will be described below with reference to the drawings. The multilayer ceramic electronic component according to the second preferred embodiment differs from the multilayer ceramic electronic component according to the first preferred embodiment, mainly in the number of external electrodes, and the description of the same features and elements as the multilayer ceramic electronic component according to the first preferred embodiment will not be thus repeated.

Figure 13:
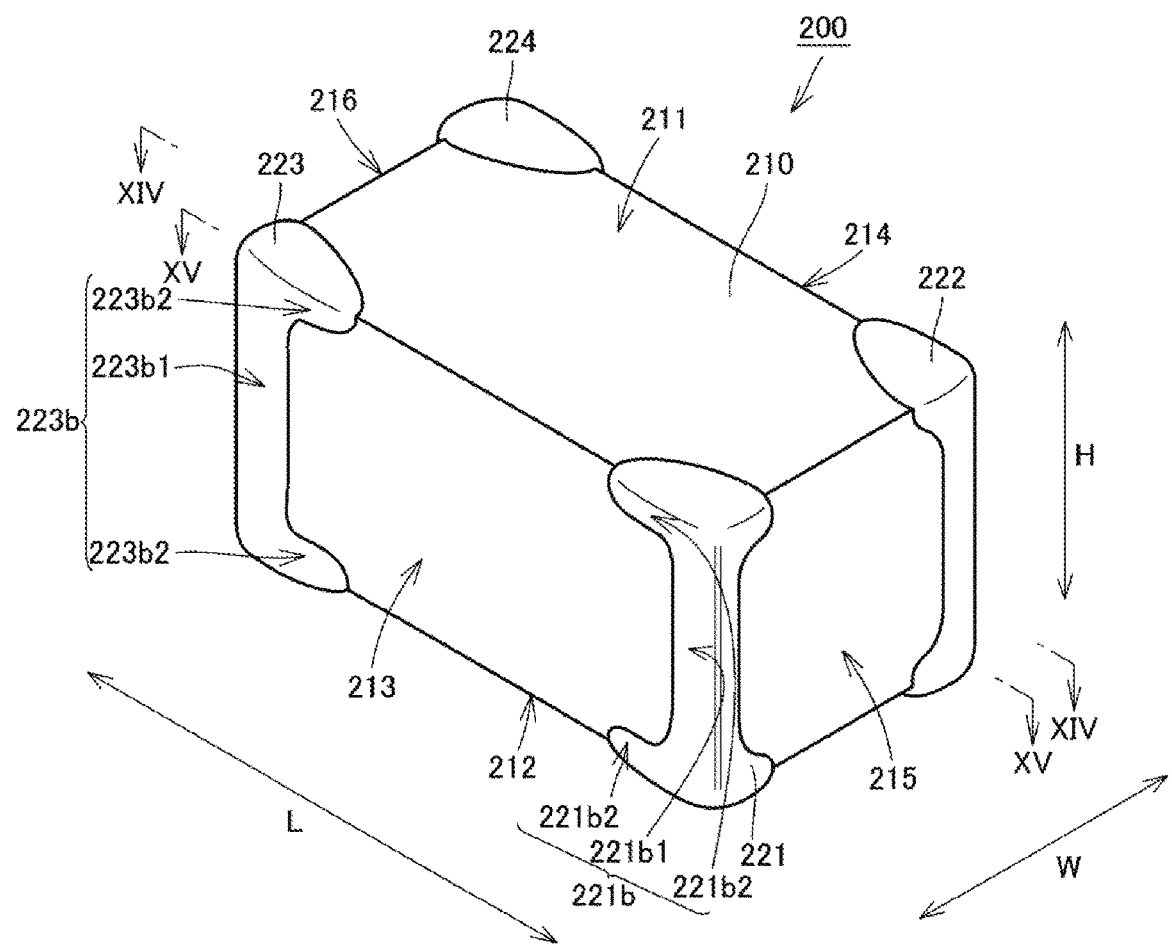
FIG. 13 is a perspective view illustrating the appearance of a multilayer ceramic electronic component according to a second preferred embodiment of the present invention.
Figure 14:
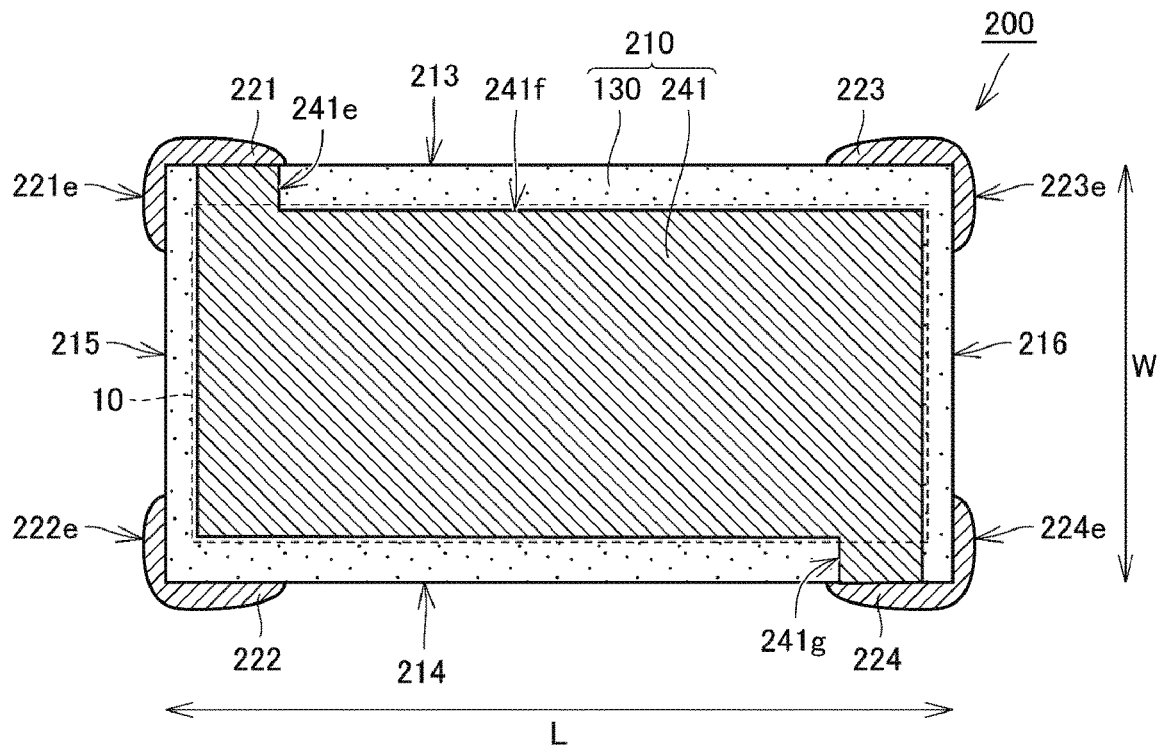
FIG. 14 is a cross-sectional view of the multilayer ceramic electronic component in FIG. 13 as viewed from the direction of XIV-XIV arrows.
Figure 15:
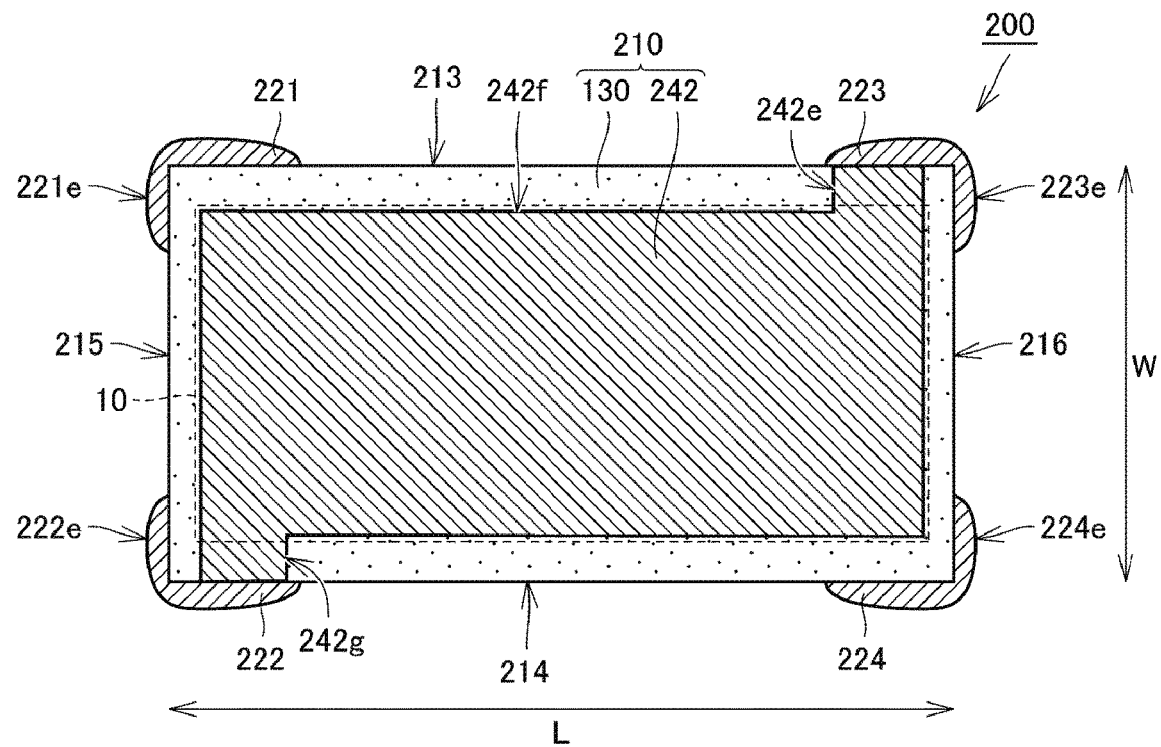
FIG. 15 is a cross-sectional view of the multilayer ceramic electronic component in FIG. 13 as viewed from the direction of XV-XV arrows.

FIG. 13 is a perspective view illustrating the appearance of a multilayer ceramic electronic component according to the second preferred embodiment. FIG. 14 is a cross-sectional view of the multilayer ceramic electronic component in FIG. 13 as viewed from the direction of XIV-XIV arrows. FIG. 15 is a cross-sectional view of the multilayer ceramic electronic component in FIG. 13 as viewed from the direction of XV-XV arrows.

As shown in FIGS. 13 to 15, the multilayer ceramic electronic component 200 according to the second preferred embodiment includes a laminated body 210, and external electrodes provided partially on the surface of the laminated body 210. The laminated body 210 includes a first principal surface 211 and a second principal surface 212 opposed to each other in the H direction of the laminated body 210, a first side surface 213 and a second side surface 214 opposed to each other, which extend parallel or substantially parallel to the H direction of the laminated body 210, and a third side surface 215 and a fourth side surface 216 opposed to each other, which extend parallel or substantially parallel to the H direction of the laminated body 210, perpendicular or substantially perpendicular to each of the first side surface 213 and the second side surface 214.

According to the present preferred embodiment, the plurality of conductor layers includes first conductor layers 241 and second conductor layers 242 located alternately in the H direction of the laminated body 210. The first conductor layers 241 and the second conductor layers 242 define and function as internal electrodes for a capacitor. It is to be noted that the plurality of conductor layers may include conductor layers different from the first conductor layers 241 and the second conductor layers 242.

The first conductor layers 241 each include a rectangular or substantially rectangular shape as viewed from the H direction of the laminated body 210, and includes an opposed portion 241f opposed to the second conductor layer 242, a first side surface extension portion 241e extended from the opposed portion 241f to the first side surface 213, and a second side surface extension portion 241g extended from the opposed portion 241f to the second side surface 214.

The second conductor layers 242 each include a rectangular or substantially rectangular shape as viewed from the H direction of the laminated body 210, and includes an opposed portion 242f opposed to the first conductor layer 241, a first side surface extension portion 242e extended from the opposed portion 242f to the first side surface 213, and a second side surface extension portion 242g extended from the opposed portion 242f to the second side surface 214.

According to the present preferred embodiment, to external electrodes spaced from each other in the L direction of the laminated body 210 are provided on each of the first side surface 213 and second side surface 214. More specifically, four external electrodes are provided on the laminated body 210.

Specifically, a first external electrode 221 is provided on a portion of the first side surface 213 closer to the third side surface 215, and a second external electrode 222 is provided on a portion of the second side surface 214 closer to the third side surface 215. A third external electrode 223 is provided on a portion of the first side surface 213 closer to the fourth side surface 216, and a fourth external electrode 224 is provided on a portion of the second side surface 214 closer to the fourth side surface 216.

The first external electrode 221 includes a first extension portion 221e that extends to the third side surface 215. When the third side surface 215 is viewed from the direction in which the third side surface 215 and the fourth side surface 216 are opposed, the first extension portion 221e includes a base portion extending along an edge of the third side surface 215 in the H direction, and protrusion portions extending from both ends of the base portion in the H direction along edges of the third side surface 215 in the direction in which the first side surface 213 and the second side surface 214 are opposed.

When the first side surface 213 is viewed from the direction in which the first side surface 213 and the second side surface 214 are opposed, a main body portion 221b of the first external electrode 221 includes a base portion 221b1 extending along an edge of the first side surface 213 in the H direction, and protrusion portions 221b2 extending from both ends of the base portion 221b1 in the H direction along edges of the first side surface 213 in the direction in which the third side surface 215 and the fourth side surface 216 are opposed.

The first external electrode 221 extends further to each of the first principal surface 211 and the second principal surface 212.

The second external electrode 222 includes a second extension portion 222e that extends to the third side surface 215. When the third side surface 215 is viewed from the direction in which the third side surface 215 and the fourth side surface 216 are opposed, the second extension portion 222e includes a base portion extending along an edge of the third side surface 215 in the H direction, and protrusion portions extending from both ends of the base portion in the H direction along edges of the third side surface 215 in the direction in which the first side surface 213 and the second side surface 214 are opposed.

When the second side surface 214 is viewed from the direction in which the first side surface 213 and the second side surface 214 are opposed, a main body portion of the second external electrode 222 includes a base portion extending along an edge of the second side surface 214 in the H direction, and protrusion portions extending from both ends of the base portion in the H direction along edges of the second side surface 214 in the direction in which the third side surface 215 and the fourth side surface 216 are opposed.

The second external electrode 222 extends further to each of the first principal surface 211 and the second principal surface 212.

The third external electrode 223 includes a third extension portion 223e that extends to the fourth side surface 216. When the fourth side surface 216 is viewed from the direction in which the third side surface 215 and the fourth side surface 216 are opposed, the third extension portion 223e includes a base portion extending along an edge of the fourth side surface 216 in the H direction, and protrusion portions extending from both ends of the base portion in the H direction along edges of the fourth side surface 216 in the direction in which the first side surface 213 and the second side surface 214 are opposed.

When the first side surface 213 is viewed from the direction in which the first side surface 213 and the second side surface 214 are opposed, a main body portion 223b of the third external electrode 223 includes a base portion 223b1 extending along an edge of the first side surface 213 in the H direction, and protrusion portions 223b2 extending from both ends of the base portion 223b1 in the H direction along edges of the first side surface 213 in the direction in which the third side surface 215 and the fourth side surface 216 are opposed.

The third external electrode 223 extends further to each of the first principal surface 211 and the second principal surface 212.

The fourth external electrode 224 includes a fourth extension portion 224e that extends to the fourth side surface 216. When the fourth side surface 216 is viewed from the direction in which the third side surface 215 and the fourth side surface 216 are opposed, the fourth extension portion 224e includes a base portion extending along an edge of the fourth side surface 216 in the H direction, and protrusion portions extending from both ends of the base portion in the H direction along edges of the fourth side surface 216 in the direction in which the first side surface 213 and the second side surface 214 are opposed.

When the second side surface 214 is viewed from the direction in which the first side surface 213 and the second side surface 214 are opposed, a main body portion of the fourth external electrode 224 includes a base portion extending along an edge of the second side surface 214 in the H direction, and protrusion portions extending from both ends of the base portion in the H direction along edges of the second side surface 214 in the direction in which the third side surface 215 and the fourth side surface 216 are opposed.

The fourth external electrode 224 extends further to each of the first principal surface 211 and the second principal surface 212.

The first external electrode 221 is electrically connected to the first side surface extension portion 241e of the first conductor layer 241. The second external electrode 222 is electrically connected to the second side surface extension portion 242g of the second conductor layer 242. The third external electrode 223 is electrically connected to the first side surface extension portion 242e of the second conductor layer 142. The fourth external electrode 224 is electrically connected to the second side surface extension portion 241g of the first conductor layer 241.

More specifically, the first external electrode 221 and the second external electrode 222 are electrically connected to different conductor layers from each other, among the plurality of conductor layers.

In the case of the multilayer ceramic electronic component 200 according to the present preferred embodiment, the first external electrode 221 is spaced away from a central portion of the first side surface 213 and a central portion of the third side surface 215. The second external electrode 222 is spaced away from a central portion of the second side surface 214 and the central portion of the third side surface 215. The third external electrode 223 is spaced away from the central portion of the first side surface 213 and a central portion of the fourth side surface 216. The fourth external electrode 224 is spaced away from the central portion of the second side surface 214 and the central portion of the fourth side surface 216.

Thus, the strain vibration generated at the first side surface 213, the second side surface 214, the third side surface 215, and the fourth side surface 216 is able to be significantly reduced or prevented from propagating to the substrate through a solder that electrically connects the first external electrode 221, the second external electrode 222, the third external electrode 223, and the fourth external electrode 224 to the substrate. As a result, the multilayer ceramic electronic component 200 is able to significantly reduce or prevent acoustic noises.

Third Preferred Embodiment

A multilayer ceramic electronic component according to a third preferred embodiment of the present invention will be described below with reference to the drawings. The multilayer ceramic electronic component according to the third preferred embodiment differs from the multilayer ceramic electronic component according to the first preferred embodiment, mainly in the number of external electrodes, and the description of the same features and elements as the multilayer ceramic electronic component according to the first preferred embodiment will not be thus repeated.

Figure 16:
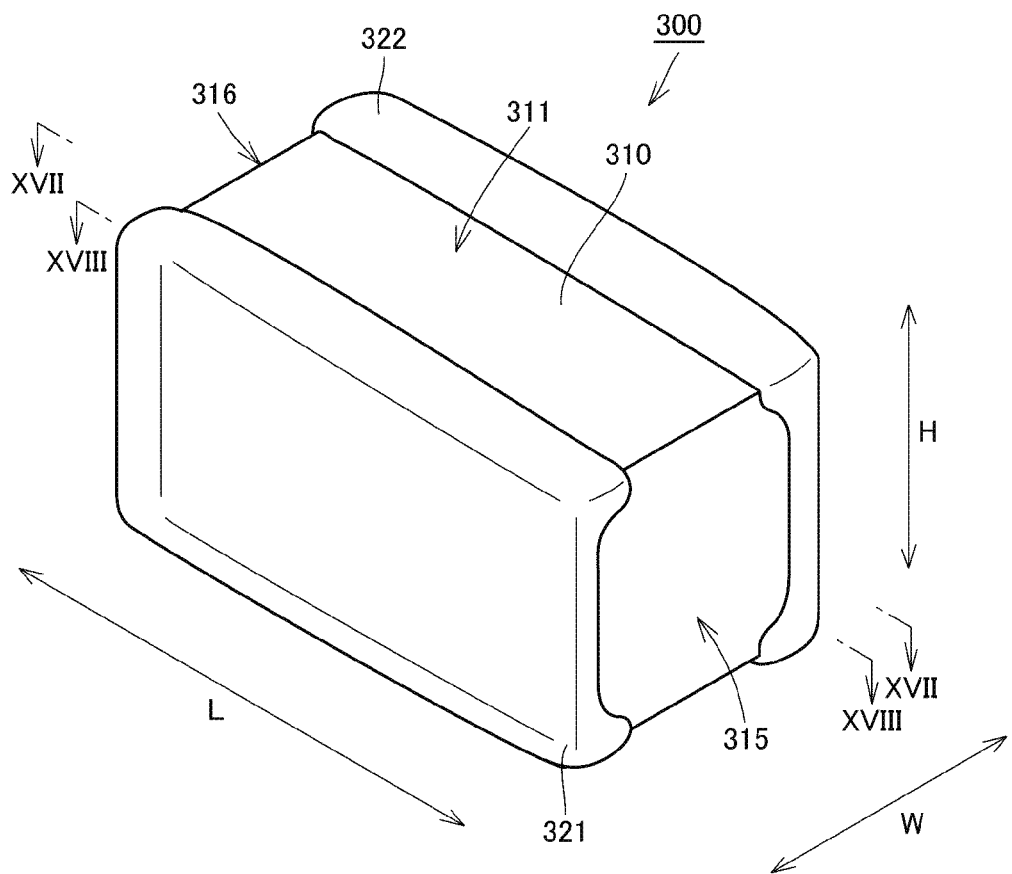
FIG. 16 is a perspective view illustrating the appearance of a multilayer ceramic electronic component according to a third preferred embodiment of the present invention.
Figure 17:
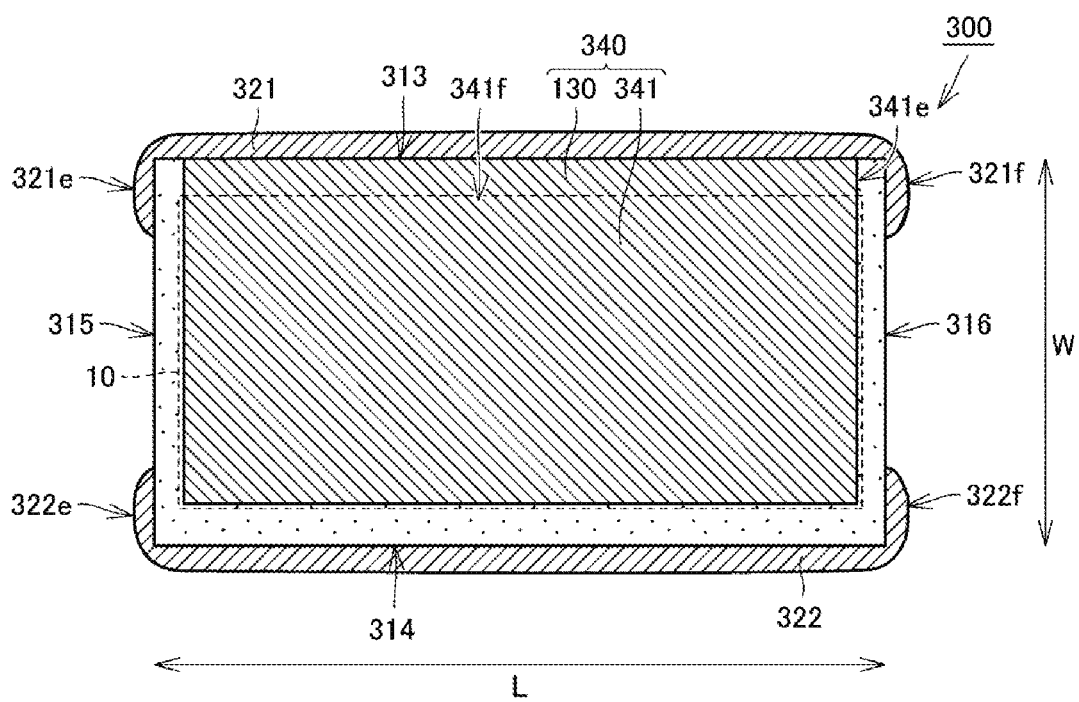
FIG. 17 is a cross-sectional view of the multilayer ceramic electronic component in FIG. 16 as viewed from the direction of XVII-XVII arrows.
Figure 18:
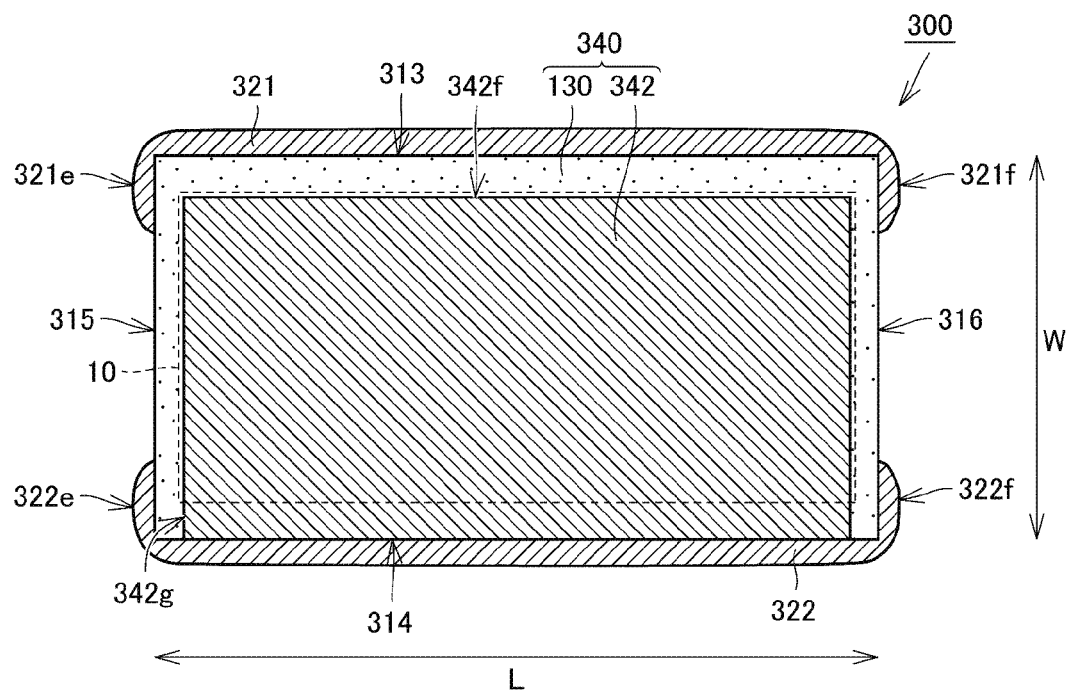
FIG. 18 is a cross-sectional view of the multilayer ceramic electronic component in FIG. 16 as viewed from the direction of XVIII-XVIII arrows.

FIG. 16 is a perspective view illustrating the appearance of a multilayer ceramic electronic component according to the third preferred embodiment. FIG. 17 is a cross-sectional view of the multilayer ceramic electronic component in FIG. 16 as viewed from the direction of XVII-XVII arrows. FIG. 18 is a cross-sectional view of the multilayer ceramic electronic component in FIG. 16 as viewed from the direction of XVIII-XVIII arrows.

As shown in FIGS. 16 to 18, the multilayer ceramic electronic component 300 according to the third preferred embodiment includes a laminated body 310, and external electrodes provided partially on the surface of the laminated body 310. The laminated body 310 includes a first principal surface 311 and a second principal surface 312 opposed to each other in the H direction of the laminated body 310, a first side surface 313 and a second side surface 314 opposed to each other, which extend parallel or substantially parallel to the H direction of the laminated body 310, and a third side surface 315 and a fourth side surface 316 opposed to each other, which extend parallel or substantially parallel to the H direction of the laminated body 310, perpendicular or substantially perpendicular to each of the first side surface 313 and the second side surface 314.

According to the present preferred embodiment, the plurality of conductor layers includes first conductor layers 341 and second conductor layers 342 located alternately in the H direction of the laminated body 310. The first conductor layers 341 and the second conductor layers 342 define and function as internal electrodes for a capacitor. It is to be noted that the plurality of conductor layers may include conductor layers different from the first conductor layers 341 and the second conductor layers 342.

The first conductor layers 341 each include a rectangular or substantially rectangular shape as viewed from the H direction of the laminated body 310, and includes an opposed portion 341f opposed to the second conductor layer 342, and a first side surface extension portion 341e extended from the opposed portion 341f to the first side surface 313.

The second conductor layers 342 each include a rectangular or substantially rectangular shape as viewed from the H direction of the laminated body 310, and includes an opposed portion 342f opposed to the first conductor layer 341, and a second side surface extension portion 342g extended from the opposed portion 342f to the second side surface 314.

According to the present preferred embodiment, one external electrode is provided on each of the first side surface 313 and second side surface 314. More specifically, two external electrodes are provided on the laminated body 310. Specifically, a first external electrode 321 and a second external electrode 322 are provided, respectively, on the first side surface 313 and the second side surface 314.

The first external electrode 321 includes a first extension portion 321e that extends to the third side surface 315. When the third side surface 315 is viewed from the direction in which the third side surface 315 and the fourth side surface 316 are opposed, the first extension portion 321e includes a base portion extending along an edge of the third side surface 315 in the H direction, and protrusion portions extending from both ends of the base portion in the H direction along edges of the third side surface 315 in the direction in which the first side surface 313 and the second side surface 314 are opposed.

The first external electrode 321 further includes a third extension portion 321f that extends to the fourth side surface 316. When the fourth side surface 316 is viewed from the direction in which the third side surface 315 and the fourth side surface 316 are opposed, the third extension portion 321f includes a base portion extending along an edge of the fourth side surface 316 in the H direction, and protrusion portions extending from both ends of the base portion in the H direction along edges of the fourth side surface 316 in the direction in which the first side surface 313 and the second side surface 314 are opposed.

The first external electrode 321 extends further to each of the first principal surface 311 and the second principal surface 312.

The second external electrode 322 includes a second extension portion 322e that extends to the third side surface 315. When the third side surface 315 is viewed from the direction in which the third side surface 315 and the fourth side surface 316 are opposed, the second extension portion 322e includes a base portion extending along an edge of the third side surface 315 in the H direction, and protrusion portions extending from both ends of the base portion in the H direction along edges of the third side surface 315 in the direction in which the first side surface 313 and the second side surface 314 are opposed.

The second external electrode 322 further includes a fourth extension portion 322f that extends to the fourth side surface 316. When the fourth side surface 316 is viewed from the direction in which the third side surface 315 and the fourth side surface 316 are opposed, the fourth extension portion 322f includes a base portion extending along an edge of the fourth side surface 316 in the H direction, and protrusion portions extending from both ends of the base portion in the H direction along edges of the fourth side surface 316 in the direction in which the first side surface 313 and the second side surface 314 are opposed.

The second external electrode 322 extends further to each of the first principal surface 311 and the second principal surface 312.

The first external electrode 321 is electrically connected to the first side surface extension portion 341e of the first conductor layer 341. The second external electrode 322 is electrically connected to the second side surface extension portion 342g of the second conductor layer 342. More specifically, the first external electrode 321 and the second external electrode 322 are electrically connected to different conductor layers from each other, among the plurality of conductor layers.

In the case of the multilayer ceramic electronic component 300 according to the present preferred embodiment, the first extension portion 321e of the first external electrode 321 and the second extension portion 322e of the second external electrode 322 are provided in the locations away from a central portion of the third side surface 315. The third extension portion 321f of the first external electrode 321 and the fourth extension portion 322f of the second external electrode 322 are provided in the locations away from a central portion of the fourth side surface 316. Thus, the strain vibration generated at the third side surface 315 and the fourth side surface 316 is able to be significantly reduced or prevented from propagating to the substrate through a solder that electrically connects the first external electrode 321 and the second external electrode 322 to the substrate. As a result, the multilayer ceramic electronic component 300 is able to significantly reduce or prevent acoustic noises.

Fourth Preferred Embodiment

A multilayer ceramic electronic component according to a fourth preferred embodiment of the present invention will be described below with reference to the drawings. The multilayer ceramic electronic component according to the fourth preferred embodiment differs from the multilayer ceramic electronic component according to the first preferred embodiment, mainly in that conductor layers define a coil, and the description of the same features and elements as the multilayer ceramic electronic component according to the first preferred embodiment will not be thus repeated.

Figure 19:
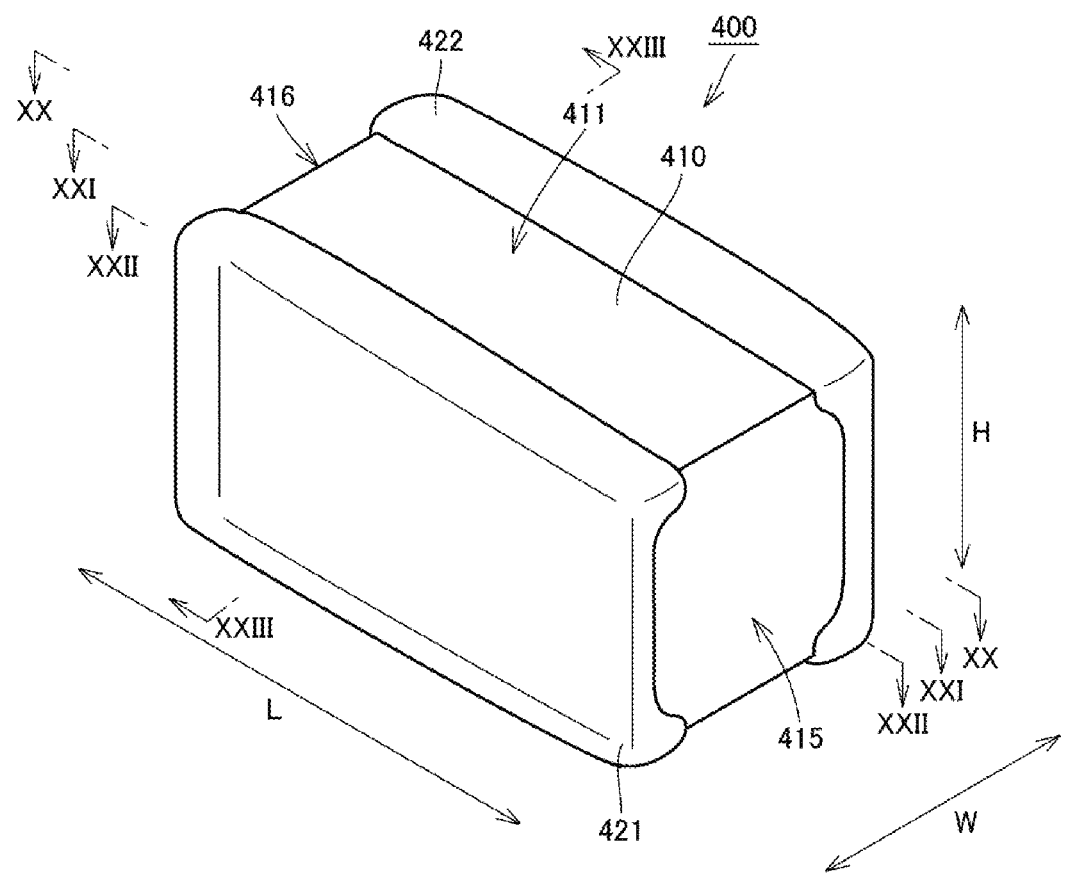
FIG. 19 is a perspective view illustrating the appearance of a multilayer ceramic electronic component according to a fourth preferred embodiment of the present invention.
Figure 20:
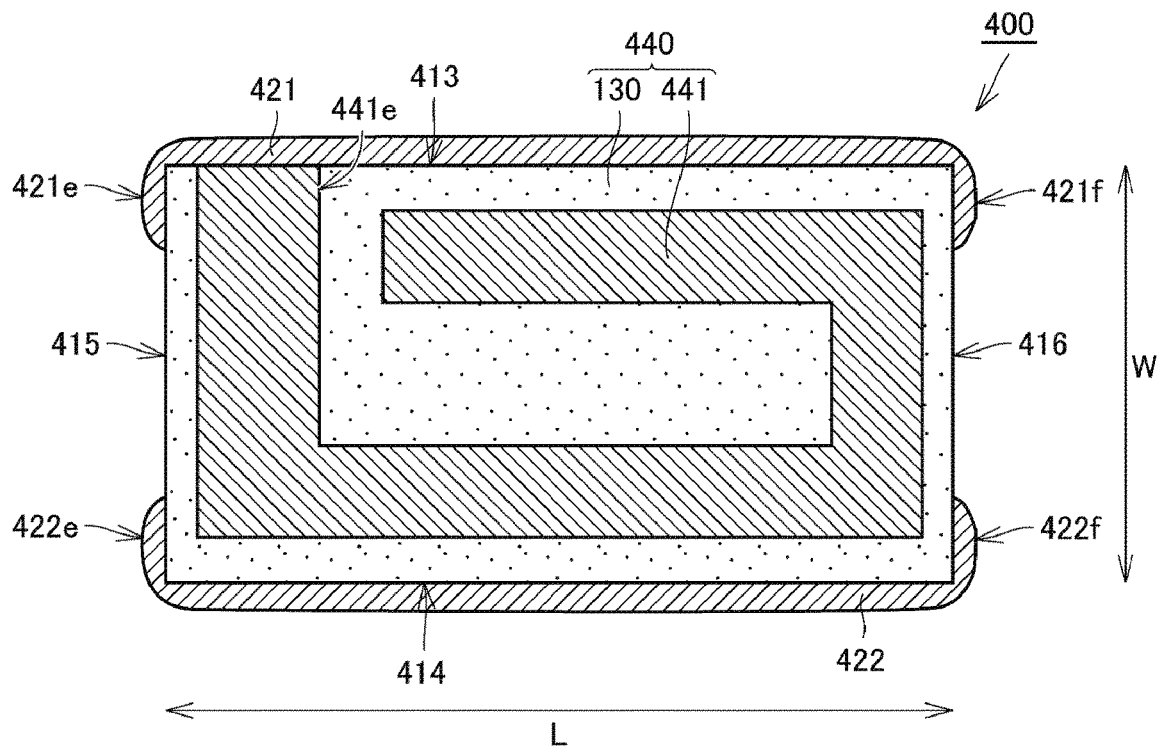
FIG. 20 is a cross-sectional view of the multilayer ceramic electronic component in FIG. 19 as viewed from the direction of XX-XX arrows.
Figure 21:
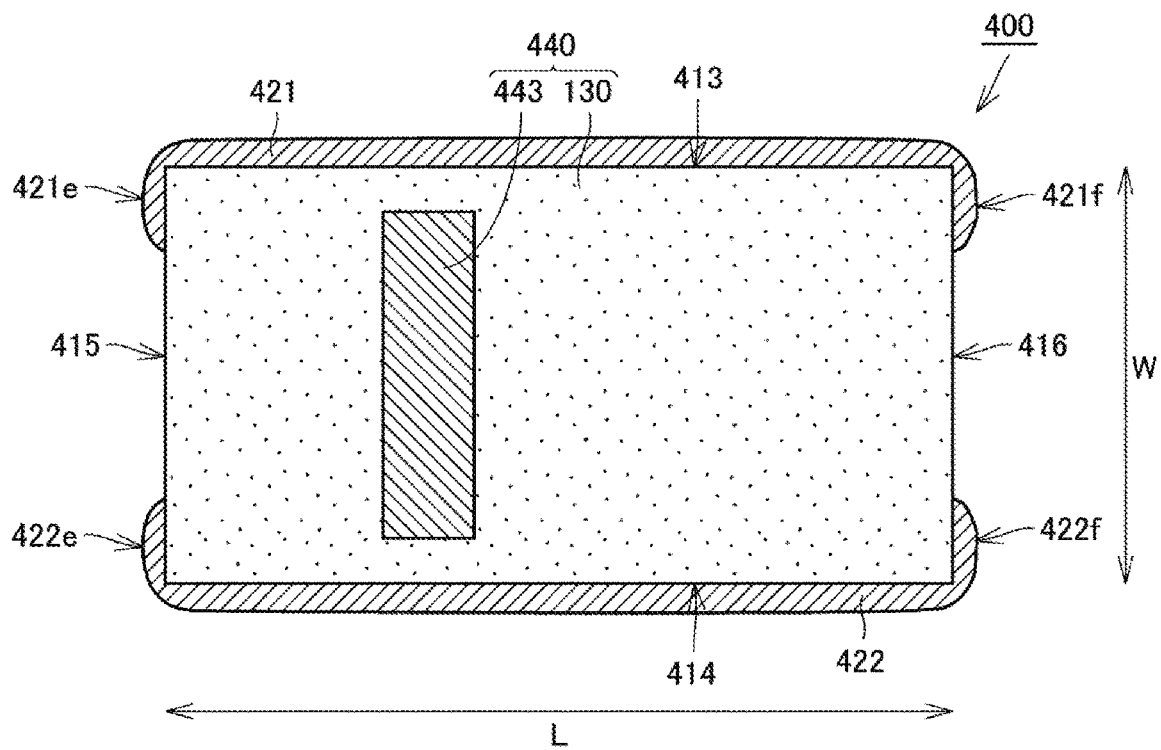
FIG. 21 is a cross-sectional view of the multilayer ceramic electronic component in FIG. 19 as viewed from the direction of XXI-XXI arrows.
Figure 22:
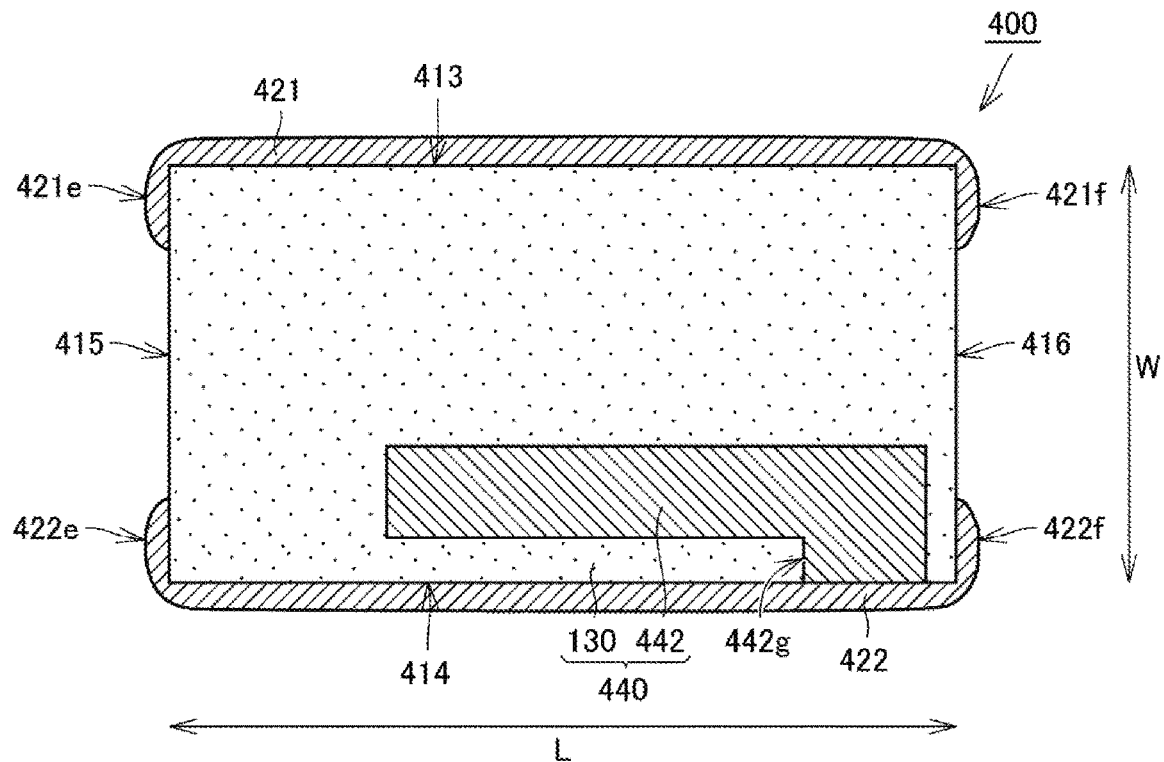
FIG. 22 is a cross-sectional view of the multilayer ceramic electronic component in FIG. 19 as viewed from the direction of XXII-XXII arrows.
Figure 23:
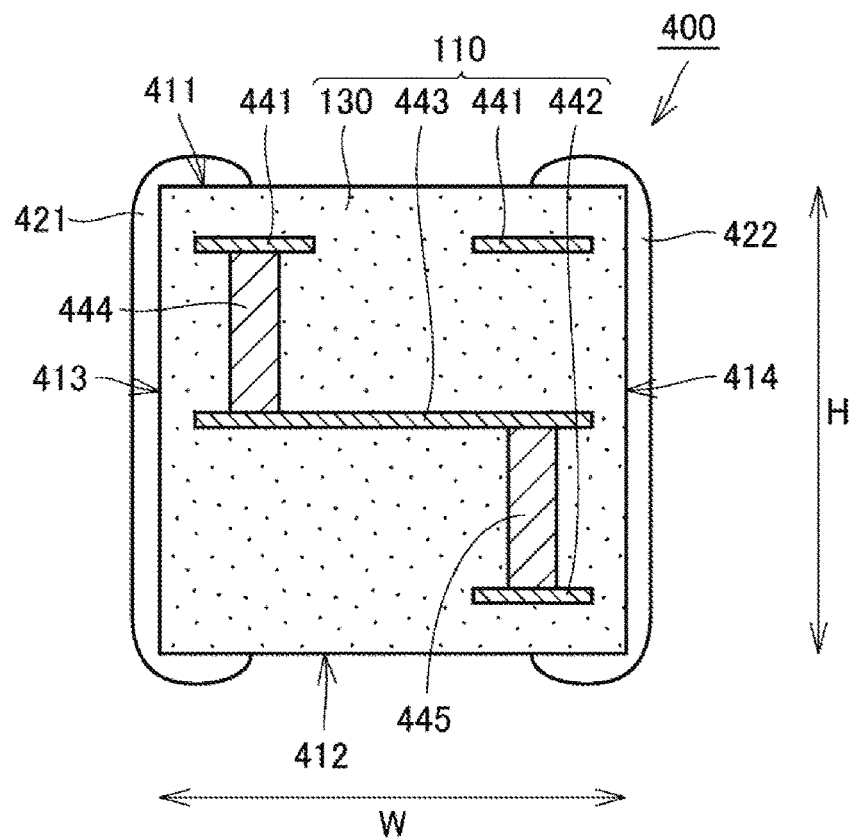
FIG. 23 is a cross-sectional view of the multilayer ceramic electronic component in FIG. 19 as viewed from the direction of XXIII-XXIII arrows.

FIG. 19 is a perspective view illustrating the appearance of a multilayer ceramic electronic component according to the fourth preferred embodiment. FIG. 20 is a cross-sectional view of the multilayer ceramic electronic component in FIG. 19 as viewed from the direction of XX-XX arrows. FIG. 21 is a cross-sectional view of the multilayer ceramic electronic component in FIG. 19 as viewed from the direction of XXI-XXI arrows. FIG. 22 is a cross-sectional view of the multilayer ceramic electronic component in FIG. 19 as viewed from the direction of XXII-XXII arrows. FIG. 23 is a cross-sectional view of the multilayer ceramic electronic component in FIG. 19 as viewed from the direction of XXIII-XXIII arrows.

As shown in FIGS. 19 to 23, the multilayer ceramic electronic component 400 according to the fourth preferred embodiment includes a laminated body 410, and external electrodes provided partially on the surface of the laminated body 410. The laminated body 410 includes a first principal surface 411 and a second principal surface 412 opposed to each other in the H direction of the laminated body 410, a first side surface 413 and a second side surface 414 opposed to each other, which extend parallel or substantially parallel to the H direction of the laminated body 410, and a third side surface 415 and a fourth side surface 416 opposed to each other, which extend parallel or substantially parallel to the H direction of the laminated body 410, perpendicular or substantially perpendicular to each of the first side surface 413 and the second side surface 414.

According to the present preferred embodiment, the plurality of conductor layers includes a first conductor layer 441, a second conductor layer 442, and a third conductor layer 443 provided in order in the H direction of the laminated body 410. The first conductor layer 441 and the third conductor layer 443 are electrically connected to each other through a via conductor 444. The second conductor layer 442 and the third conductor layer 443 are electrically connected to each other through a via conductor 445. The first conductor layer 441, the second conductor layer 442, and the third conductor layer 443 define a coil.

The first conductor layer 441 includes a first side surface extension portion 441e extended to the first side surface 413. The second conductor layer 442 includes a second side surface extension portion 442g extended to the second side surface 414.

According to the present preferred embodiment, one external electrode is provided on each of the first side surface 413 and second side surface 414. More specifically, two external electrodes are provided on the laminated body 410. Specifically, a first external electrode 421 and a second external electrode 422 are provided, respectively, on the first side surface 413 and the second side surface 414.

The first external electrode 421 includes a first extension portion 421e that extends to the third side surface 415. When the third side surface 415 is viewed from the direction in which the third side surface 415 and the fourth side surface 416 are opposed, the first extension portion 421e includes a base portion extending along an edge of the third side surface 415 in the H direction, and protrusion portions extending from both ends of the base portion in the H direction along edges of the third side surface 415 in the direction in which the first side surface 413 and the second side surface 414 are opposed.

The first external electrode 421 further includes a third extension portion 421f that extends to the fourth side surface 416. When the fourth side surface 416 is viewed from the direction in which the third side surface 415 and the fourth side surface 416 are opposed, the third extension portion 421f includes a base portion extending along an edge of the fourth side surface 416 in the H direction, and protrusion portions extending from both ends of the base portion in the H direction along edges of the fourth side surface 416 in the direction in which the first side surface 413 and the second side surface 414 are opposed.

The first external electrode 421 extends further to each of the first principal surface 411 and the second principal surface 412.

The second external electrode 422 includes a second extension portion 422e that extends to the third side surface 415. When the third side surface 415 is viewed from the direction in which the third side surface 415 and the fourth side surface 416 are opposed, the second extension portion 422e includes a base portion extending along an edge of the third side surface 415 in the H direction, and protrusion portions extending from both ends of the base portion in the H direction along edges of the third side surface 415 in the direction in which the first side surface 413 and the second side surface 414 are opposed.

The second external electrode 422 further includes a fourth extension portion 422f that extends to the fourth side surface 416. When the fourth side surface 416 is viewed from the direction in which the third side surface 415 and the fourth side surface 416 are opposed, the fourth extension portion 422f includes a base portion extending along an edge of the fourth side surface 416 in the H direction, and protrusion portions extending from both ends of the base portion in the H direction along edges of the fourth side surface 416 in the direction in which the first side surface 413 and the second side surface 414 are opposed.

The second external electrode 422 extends further to each of the first principal surface 411 and the second principal surface 412.

The first external electrode 421 is electrically connected to the first side surface extension portion 441e of the first conductor layer 441. The second external electrode 422 is electrically connected to the second side surface extension portion 442g of the second conductor layer 442. More specifically, the first external electrode 421 and the second external electrode 422 are electrically connected to different conductor layers from each other, among the plurality of conductor layers.

In the case of the multilayer ceramic electronic component 400 according to the present preferred embodiment, the first extension portion 421e of the first external electrode 421 and the second extension portion 422e of the second external electrode 422 are provided in the locations away from a central portion of the third side surface 415. The third extension portion 421f of the first external electrode 421 and the fourth extension portion 422f of the second external electrode 422 are provided in the locations away from a central portion of the fourth side surface 416. Thus, the strain vibration generated at the third side surface 415 and the fourth side surface 416 is able to be significantly reduced or prevented from propagating to the substrate through a solder that electrically connects the first external electrode 421 and the second external electrode 422 to the substrate. As a result, the multilayer ceramic electronic component 400 is able to significantly reduce or prevent acoustic noises.

In regard to the explanation of the preferred embodiments described above, components and elements of the preferred embodiments are able to be replaced by or combined with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer ceramic electronic component comprising:
a rectangular parallelepiped or substantially rectangular parallelepiped laminated body including a plurality of dielectric layers and a plurality of conductor layers, the laminated body including a first principal surface and a second principal surface opposed to each other in a laminating direction, a first side surface and a second side surface opposed to each other, which extend parallel or substantially parallel to the laminating direction, and a third side surface and a fourth side surface opposed to each other, which extend parallel or substantially parallel to the laminating direction, perpendicular or substantially perpendicular to each of the first side surface and the second side surface;
a first external electrode provided at least partially on the first side surface;

a second external electrode provided at least partially on the second side surface; and on the first side surface or the second side surface, a third external electrode electrically connected to at least one conductor layer among the plurality of conductor layers; wherein among the plurality of conductor layers, at least one conductor layer includes a first side surface extension portion that extends to the first side surface;

among the plurality of conductor layers, at least one conductor layer includes a second side surface extension portion that extends to the second side surface;

the first external electrode is electrically connected to the first side surface extension portion;

the second external electrode is electrically connected to the second side surface extension portion;

the first external electrode includes a first extension portion that extends to the third side surface;

the second external electrode includes a second extension portion that extends to the third side surface;

when the third side surface is viewed from a direction in which the third side surface and the fourth side surface are opposed, the first extension portion and the second extension portion each include:
  a base portion extending along an edge of the third side surface in the laminating direction; and
  protrusion portions extending from both ends of the base portion in the laminating direction along edges of the third side surface and extending in a direction in which the first side surface and the second side surface are opposed; and a length of the first and second side surfaces is greater than a length of the third and fourth side surfaces.

2. The multilayer ceramic electronic component according to claim 1, wherein the first external electrode and the second external electrode are electrically connected to different conductor layers from each other, among the plurality of conductor layers.

3. The multilayer ceramic electronic component according to claim 1, wherein the first external electrode and the second external electrode are electrically connected to a same conductor layer from among the plurality of conductor layers.

4. The multilayer ceramic electronic component according to claim 1, wherein Db/Da about 0.25 and Dd/Dc about 0.25 are satisfied when in each of the first extension portion and the second extension portion:
  a line electrically connecting tips of the protrusion portions to each other indicates a first imaginary line;
  a middle point of the first imaginary line in the laminating direction indicates a first imaginary point;
  a line extending through the first imaginary point in the direction in which the first side surface and the second side surface are opposed indicates a second imaginary line;
  a distance is denoted by Da between an intersection of an outer edge of the base portion with the second imaginary line, and the first imaginary point;
  a distance is denoted by Db between an intersection of an inner edge of the base portion with the second imaginary line, and the first imaginary point;
  a midpoint indicates a second imaginary point between an intersection of the inner edge of the base portion with the second imaginary line, and the first imaginary point;
  a line extending through the second imaginary point in the laminating direction indicates a third imaginary line;
  a distance is denoted by Dc between intersections of outer edges of the respective protrusion portions, with the third imaginary line; and
  a distance is denoted by Dd between intersections of inner edges of the respective protrusion portions, with the third imaginary line.

5. The multilayer ceramic electronic component according to claim 1, wherein when the first side surface is viewed from the direction in which the first side surface and the second side surface are opposed, the first external electrode includes:
  a base portion extending along an edge of the first side surface in the laminating direction; and
  protrusion portions extending from both ends of the base portion in the laminating direction along edges of the first side surface and extending in the direction in which the third side surface and the fourth side surface are opposed.

6. The multilayer ceramic electronic component according to claim 1, wherein when the second side surface is viewed from the direction in which the first side surface and the second side surface are opposed, the second external electrode includes:
  a base portion extending along an edge of the second side surface in the laminating direction; and
  protrusion portions extending from both ends of the base portion in the laminating direction along edges of the second side surface and extending in the direction in which the third side surface and the fourth side surface are opposed.

7. The multilayer ceramic electronic component according to claim 1, wherein among the plurality of conductor layers, at least two conductor layers define and function as internal electrodes for a capacitor.

8. The multilayer ceramic electronic component according to claim 1, wherein among the plurality of conductor layers, at least two conductor layers define a coil.

9. The multilayer ceramic electronic component according to claim 1, wherein the laminated body includes a cuboid or substantially cuboid shape.

10. The multilayer ceramic electronic component according to claim 1, wherein the plurality of conductor layers includes a plurality of first conductor layers and a plurality of second conductor layers located alternately in the laminating direction.

11. The multilayer ceramic electronic component according to claim 1, further comprising:
  a fourth external electrode provided at least partially on the second side surface; wherein
  the third external electrode is provided at least partially on the first side surface and includes a third extension portion that extends to the fourth side surface; and
  the fourth external electrode includes a fourth extension portion that extends to the fourth side surface.

12. The multilayer ceramic electronic component according to claim 11, wherein when the first side surface is viewed from the direction in which the third side surface and the fourth side surface are opposed, the third extension portion and the fourth extension portion each include:
  a base portion extending along an edge of the fourth side surface in the laminating direction; and
  protrusion portions extending from both ends of the base portion in the laminating direction along edges of the fourth side surface in the direction in which the first side surface and the second side surface are opposed.

13. The multilayer ceramic electronic component according to claim 11, further comprising:

a fifth external electrode provided at least partially on the first side surface; and a sixth external electrode provided at least partially on the second side surface; wherein the fifth external electrode extends to each of the first principal surface and the second principal surface; and the sixth external electrode extends to each of the first principal surface and the second principal surface.

14. The multilayer ceramic electronic component according to claim 13, wherein;

the fifth external electrode is located between the first external electrode and the third external electrode; and the sixth external electrode is located between the second external electrode and the fourth external electrode.

15. The multilayer ceramic electronic component according to claim 13, wherein the at least one conductor layer that includes the first side surface extension portion further includes a third side surface extension portion;

the at least one conductor layer that includes the second side surface extension portion further includes a fourth side surface extension portion;

the third external electrode is electrically connected to the fourth side surface extension portion; and the fourth external electrode is electrically connected to the third side surface extension portion.

16. The multilayer ceramic electronic component according to claim 13, wherein each of the first to sixth electrodes includes a base electrode layer and a plating layer located on the base electrode layer.

17. The multilayer ceramic electronic component according to claim 16, wherein the base electrode layer includes a baked layer and a thin film layer.

18. The multilayer ceramic electronic component according to claim 16, wherein the plating layer includes a Sn plating layer and a Ni plating layer.

19. The multilayer ceramic electronic component according to claim 11, wherein the third external electrode is electrically connected to the first side surface extension portion; and the fourth external electrode is electrically connected to the second side surface extension portion.

* * * * *